United States Patent
Iwase et al.

(10) Patent No.: US 7,630,366 B2
(45) Date of Patent: Dec. 8, 2009

(54) MULTIPLEXING APPARATUS, MULTIPLEXING METHOD, PROGRAM, AND RECORDING MEDIUM

(75) Inventors: Ayako Iwase, Kanagawa (JP); Motoki Kato, Kanagawa (JP)

(73) Assignee: Sony Corporation, Tokyo (JP)

( * ) Notice: Subject to any disclaimer, the term of this patent is extended or adjusted under 35 U.S.C. 154(b) by 643 days.

(21) Appl. No.: 11/366,434

(22) Filed: Mar. 3, 2006

(65) Prior Publication Data

US 2006/0215664 A1    Sep. 28, 2006

(30) Foreign Application Priority Data

Mar. 11, 2005  (JP)  ............................. 2005-068534

(51) Int. Cl.
*H04L 12/28* (2006.01)
*H04J 3/24* (2006.01)
*H04R 5/00* (2006.01)

(52) U.S. Cl. ...................... 370/389; 370/474; 381/23

(58) Field of Classification Search ............. 381/20–23; 370/389, 392, 471, 473, 474, 493, 535, 348, 370/385.64, 725

See application file for complete search history.

(56) References Cited

U.S. PATENT DOCUMENTS

2001/0055318 A1* 12/2001 Obata et al. ................. 370/474
2003/0106069 A1*  6/2003 Crinon ....................... 725/134

OTHER PUBLICATIONS

U.S. Appl. No. 11/911,666, filed Oct. 16, 2007, Iwase, et al.

* cited by examiner

*Primary Examiner*—Chirag G Shah
*Assistant Examiner*—Amarnauth Persaud
(74) *Attorney, Agent, or Firm*—Oblon, Spivak, McClelland, Maier & Neustadt, L.L.P.

(57) ABSTRACT

A multiplexing apparatus for multiplexing audio data into transport stream (TS) packets includes a first encoding section encoding the audio data by a first encoding method; a second encoding section encoding the audio data by a second encoding method, which is a variable-length encoding method and which differs from the first encoding method, for attaching a timing value indicating a timing used when audio data is decoded in units of predetermined audio data; a packetization section packetizing the audio data encoded by the first encoding section and the audio data encoded by the second encoding section into TS packets and for attaching the same ID to a plurality of packetized TS packets; a determination section determining a TS packet to be multiplexed from among the plurality of TS packets packetized by the packetization section; and a multiplexing section multiplexing the TS packet determined by the determination section.

10 Claims, 16 Drawing Sheets

FIG. 7

MULTIPLEXING APPARATUS, MULTIPLEXING METHOD, PROGRAM, AND RECORDING MEDIUM

CROSS REFERENCES TO RELATED APPLICATIONS

The present invention contains subject matter related to Japanese Patent Application JP 2005-068534 filed in the Japanese Patent Office on Mar. 11, 2005, the entire contents of which are incorporated herein by reference.

BACKGROUND OF THE INVENTION

1. Field of the Invention

The present invention relates to a multiplexing apparatus, a multiplexing method, a program, and a recording medium. More particularly, the present invention relates to a multiplexing apparatus for multiplexing transport stream (TS) packets of an audio stream encoded by different encoding methods, a multiplexing method for use therewith, a program for use therewith, and a recording medium for use therewith.

2. Description of the Related Art

When a video stream and an audio stream are divided into TS packets and are multiplexed by using an MPEG (Moving Picture Expert Group) method, a standard model (system target decoder (STD)) is assumed as a decoder. An encoding process is performed so that a decoding process can be performed correctly in this STD.

For example, in Japanese Unexamined Patent Application Publication No. 9-261604, a technology in which an encoding apparatus shown in FIG. 1 assumes an STD model shown in FIG. 2, converts an elementary stream into TS packets, and generates an MPEG transport stream is disclosed.

The encoding apparatus of FIG. 1 includes an access unit detector 1, a pseudo-access unit calculator 2, a packetizer 3, and a scheduler 4. The STD model of FIG. 2 includes a pre-stage buffer 21, a post-stage buffer 22, and a decoder 23.

The access unit detector 1 of the encoding apparatus obtains an access unit from an elementary stream, and detects the size of the access unit and decoding time information. On the basis of the size of the pre-stage buffer 21 of FIG. 2 and the rate at which data is transferred to the pre-stage buffer 21, the pseudo-access unit calculator 2 calculates a time (input completion time) (time at which the pseudo-access unit is decoded) at which the pseudo-access unit is input to the pre-stage buffer 21 when the access unit is divided into pseudo-access units of a predetermined size. The scheduler 4 calculates the time (clock reference) at which a multiplexed stream is supplied to a decoder and the size of the packets (packet size) on the basis of the size of the pseudo-access unit and the pseudo-decoding time.

The packetizer 3 packetizes the elementary stream in accordance with the packet size, encodes the decoding time and the clock reference, and generates an MPEG transport stream. The generated MPEG transport stream is transmitted via a transmission path 5 or is recorded on a recording medium 6.

When the audio stream is to be packetized into TS packets using an MPEG method and is to be multiplexed into one transport stream, the audio stream is encoded in advance by a predetermined encoding method. Examples of the encoding method include a fixed-length encoding method and a variable-length encoding method.

Accordingly, it is considered to multiplex two audio streams encoded by different encoding methods into one transport stream.

SUMMARY OF THE INVENTION

However, in an STD model shown in FIG. 2, it is not assumed that two audio streams encoded by different encoding methods are packetized into TS packets and are multiplexed. It is difficult to packetize two audio streams encoded by different encoding methods into TS packets and multiplex them into one transport stream.

The present invention has been made in view of such circumstances. It is desirable to multiplex two audio streams encoded by different encoding methods into one transport stream.

According to an embodiment of the present invention, there is provided a multiplexing apparatus for multiplexing audio data into transport stream (TS) packets, the multiplexing apparatus including: first encoding means for encoding the audio data by a first encoding method, which is a predetermined encoding method; second encoding means for encoding the audio data by a second encoding method, which is a variable-length encoding method, which differs from the first encoding method, and which attaches a timing value indicating a timing used when audio data is decoded in units of predetermined audio data; packetization means for packetizing the audio data encoded by the first encoding means and the audio data encoded by the second encoding means into TS packets and for attaching the same ID to a plurality of packetized TS packets; determination means for determining a TS packet to be multiplexed from among the plurality of TS packets packetized by the packetization means; and multiplexing means for multiplexing the TS packet determined by the determination means, wherein the determination means assumes a first system target decoder for decoding the audio data encoded by the first encoding means and a second system target decoder for decoding the audio data encoded by the second encoding means on the basis of the timing value attached to the audio data encoded by the second encoding means, and determines a TS packet to be multiplexed.

The determination means may determine a TS packet to be multiplexed from among the plurality of TS packets packetized by the packetization means on the basis of a first elementary buffer possessed by the first system target decoder and a rate at which data is transferred to the first elementary buffer and on the basis of a second elementary buffer possessed by the second system target decoder and a rate at which data is transferred to the second elementary buffer.

The determination means may determine a TS packet to be multiplexed from among the plurality of TS packets packetized by the packetization means so that the first elementary buffer possessed by the first system target decoder and the second elementary buffer possessed by the second system target decoder do not overflow or underflow.

The multiplexing apparatus may further include recording means for recording the TS packets multiplexed by the multiplexing means on a recording medium.

The unit of the audio data may be an audio access unit.

The first system target decoder may have a transport buffer at a stage prior to the first elementary buffer, and the second system target decoder may have a transport buffer at a stage prior to the second elementary buffer and may have a third elementary buffer at a stage subsequent to the second elementary.

The determination means may determine a TS packet to be multiplexed from among the plurality of TS packets packetized by the packetization means by assuming that the timing for input to the third elementary buffer is a timing for the timing value.

The timing value may be a value represented by a sampling period of audio information, at which the unit of an audio stream is passed to the third elementary buffer.

According to another embodiment of the present invention, there is provided a multiplexing method including the steps of: encoding the audio data by a first encoding method, which is a predetermined encoding method; encoding the audio data by a second encoding method, which is a variable-length encoding method, which differs from the first encoding method, and which attaches a timing value indicating a timing used when audio data is decoded in units of predetermined audio data; packetizing the audio data encoded in the first encoding step and the audio data encoded in the second encoding step into TS packets and attaching the same ID to a plurality of packetized TS packets; determining a TS packet to be multiplexed from among the plurality of TS packets packetized in the packetization step; and multiplexing the TS packet determined in the determination step, wherein the determination step assumes a first system target decoder for decoding the audio data encoded in the first encoding step, and a second system target decoder for decoding the audio data encoded in the second encoding step on the basis of the timing value attached to the audio data encoded in the second encoding step, and determines a TS packet to be multiplexed.

According to another embodiment of the present invention, there is provided a program for multiplexing audio data into transport stream (TS) packets, the program enabling a computer to perform processing including the steps of: encoding the audio data by a first encoding method, which is a predetermined encoding method; encoding the audio data by a second encoding method, which is a variable-length encoding method and which differs from the first encoding method, for attaching a timing value indicating a timing used when audio data is decoded in predetermined units of audio data; packetizing the audio data encoded in the first encoding step and the audio data encoded in the second encoding step into TS packets and attaching the same ID to a plurality of packetized TS packets; determining a TS packet to be multiplexed from among the plurality of TS packets packetized in the packetization step; and multiplexing the TS packet determined in the determination step, wherein the determination step assumes a first system target decoder for decoding the audio data encoded in the first encoding step, and a second system target decoder for decoding the audio data encoded in the second encoding step on the basis of the timing value attached to the audio data encoded in the second encoding step, and determines a TS packet to be multiplexed.

In an embodiment of the present invention, audio data encoded by a first encoding method, and audio data encoded by a second encoding method for attaching a timing value indicating a timing used when audio data is decoded in each unit of predetermined audio data are packetized into TS packets. A first system target decoder for decoding the audio data encoded by the first encoding method, and a second system target decoder for decoding the audio data encoded by the second encoding method are assumed, TS packets to be multiplexed are determined, and the TS packets are multiplexed.

On the recording medium according to an embodiment of the present invention, a plurality of TS packets in which audio data encoded by the first encoding method, which is a predetermined encoding method, are packetized into TS packets and a plurality of TS packets in which audio data encoded by the second encoding method, which is a variable-length encoding method and which differs from the first encoding method, for attaching a timing value indicating a timing used when audio data is decoded in units of predetermined audio data, are multiplexed and recorded. The TS packets are TS packets that are determined to be multiplexed by assuming the first system target decoder for decoding audio data encoded by the first encoding method and the second system target decoder for decoding audio data on the basis of the timing value attached to the audio data encoded by the second encoding method.

In another embodiment of the present invention, a plurality of TS packets in which audio data encoded by the first encoding method are packetized into TS packets and a plurality of TS packets in which the audio data encoded by the second encoding method for attaching a timing value indicating a timing used when audio data is decoded in units of predetermined audio data, are multiplexed and recorded. The TS packets are TS packets that are determined to be multiplexed by assuming the first system target decoder for decoding audio data encoded by the first encoding method and the second system target decoder for decoding audio data on the basis of the timing value attached to the audio data encoded by the second encoding method.

BRIEF DESCRIPTION OF THE DRAWINGS

FIG. 7 illustrates a TS that is input to a TS multiplexing section of FIG. 4;

DESCRIPTION OF THE PREFERRED EMBODIMENTS

Before describing an embodiment of the present invention, the correspondence between the features of the claims and the specific elements disclosed in an embodiment of the present invention is discussed below. This description is intended to assure that embodiments supporting the claimed invention are described in this specification. Thus, even if an element in the following embodiments is not described as relating to a certain feature of the present invention, that does not necessarily mean that the element does not relate to that feature of the claims. Conversely, even if an element is described herein as relating to a certain feature of the claims, that does not necessarily mean that the element does not relate to other features of the claims.

Furthermore, this description should not be construed as restricting that all the aspects of the invention disclosed in the embodiments are described in the claims. That is, the description does not deny the existence of aspects of the present invention that are described in the embodiments but not claimed in the invention of this application, i.e., the existence of aspects of the present invention that in future may be claimed by a divisional application, or that may be additionally claimed through amendments.

Figure 9:
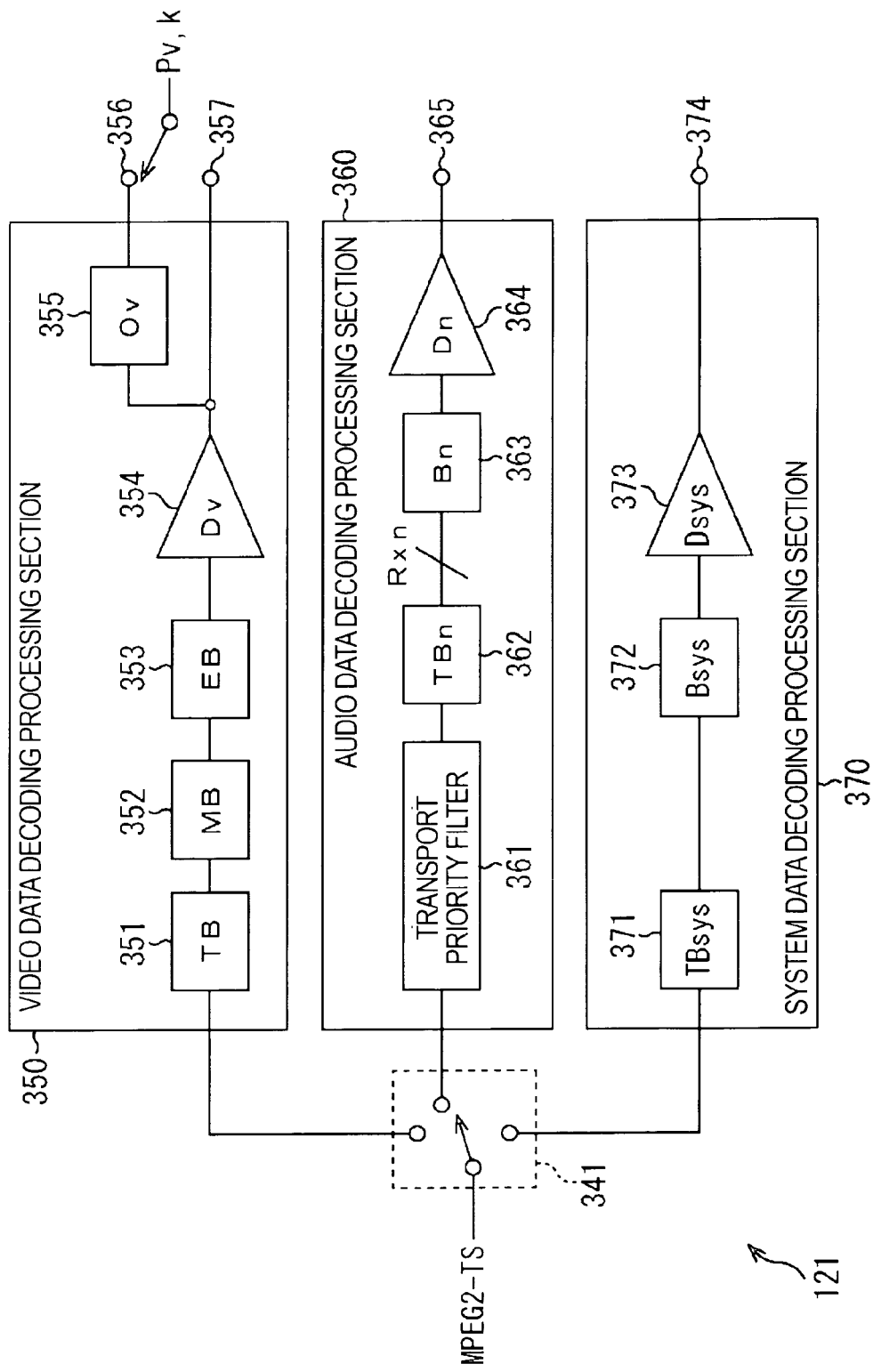
FIG. 9 shows an example of a model of a system target decoder of FIG. 3.
Figure 10:
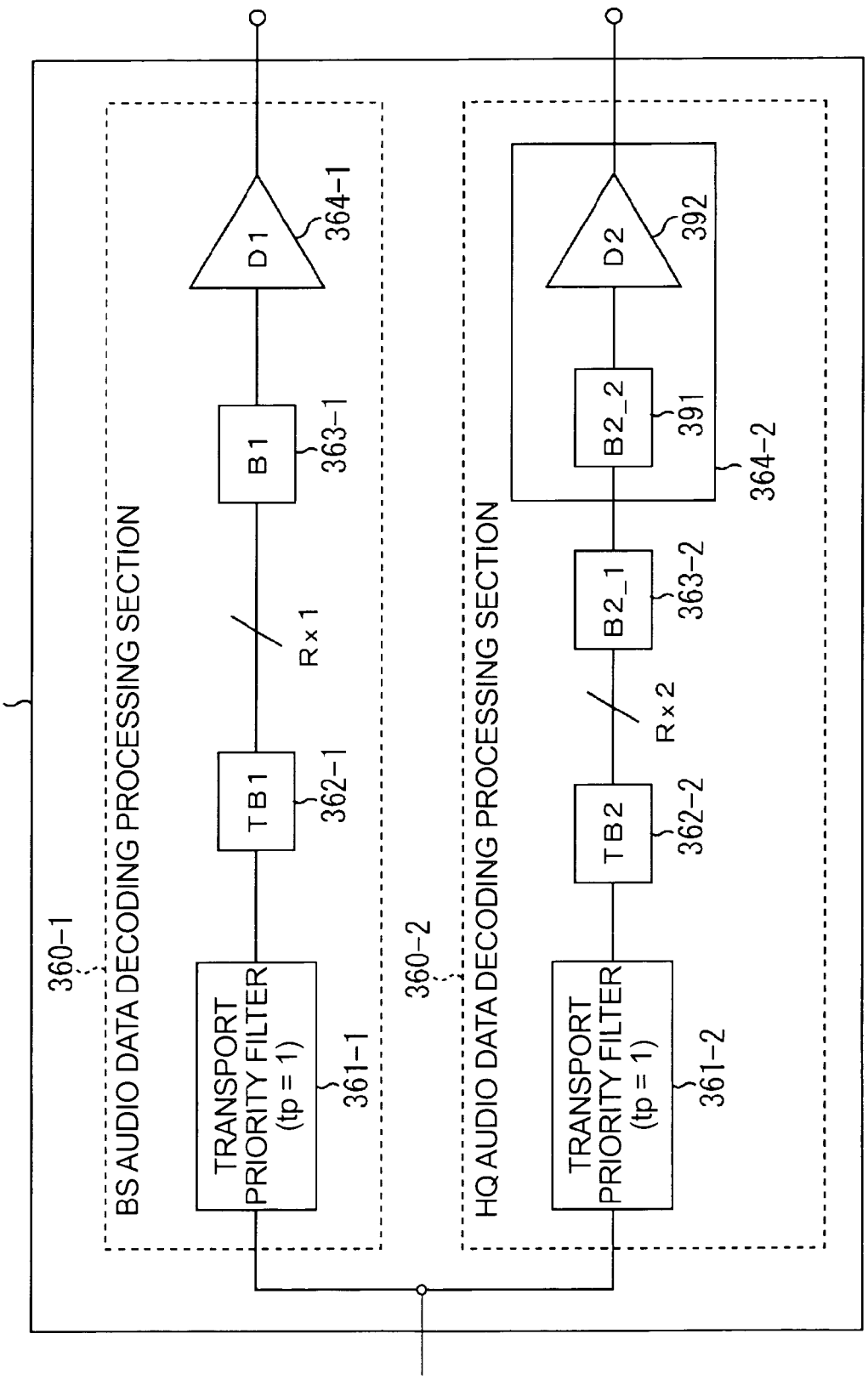
FIG. 10 illustrates a detailed example of an audio data decoding processing section of FIG. 9.

The multiplexing apparatus (for example, a transmission apparatus 111 of FIG. 4) for multiplexing audio data into transport stream (TS) packets according to an embodiment of the present invention includes: first encoding means (for example, a first encoder 141 of FIG. 4) for encoding the audio data by a first encoding method, which is a predetermined encoding method; second encoding means (for example, a second encoder 142 of FIG. 4) for encoding the audio data by a second encoding method, which is a variable-length encoding method and which differs from the first encoding method, for attaching a timing value (for example, input timing) indicating a timing used when audio data is decoded in units (for example, audio access units) of predetermined audio data; packetization means (for example, a TS packetization section 137 of FIG. 4) for packetizing the audio data encoded by the first encoding means and the audio data encoded by the second encoding means into TS packets and for attaching the same ID (for example, a PID) to a plurality of packetized TS packets; determination means (for example, a control section 135 of FIG. 4) for determining a TS packet to be multiplexed from among the plurality of TS packets packetized by the packetization means; and multiplexing means (for example, a multiplexing section 138 of FIG. 4) for multiplexing the TS packet determined by the determination means, wherein the determination means assumes a first system target decoder (for example, a system target decoder 121 in which a BS audio data decoding processing section 360-1 of FIG. 9 is applied to an audio data decoding processing section 360 of FIG. 9) for decoding the audio data encoded by the first encoding means and a second system target decoder (for example, a system target decoder 121 in which an HQ audio data decoding processing section 360-2 of FIG. 10 is applied to an audio data decoding processing section 360 of FIG. 9) for decoding the audio data encoded by the second encoding means on the basis of the timing value attached to the audio data encoded by the second encoding means, and determines (for example, step S60 of FIG. 13) a TS packet to be multiplexed.

The determination means according to an embodiment of the present invention determines a TS packet to be multiplexed from among the plurality of TS packets packetized by the packetization means on the basis of a first elementary buffer (for example, an elementary buffer 363-1 of FIG. 10) possessed by the first system target decoder and a rate (for example, Rx1 of FIG. 10) at which data is transferred to the first elementary buffer and on the basis of a second elementary buffer (for example, an elementary buffer 363-2 of FIG. 10) possessed by the second system target decoder and a rate (for example, Rx2 of FIG. 10) at which data is transferred to the second elementary buffer.

The multiplexing apparatus according to an embodiment of the present invention may further include recording means (for example, a drive 112 of FIG. 3) for recording the TS packets multiplexed by the multiplexing means on a recording medium.

The first system target decoder according to an embodiment of the present invention has a transport buffer (for example, a transport buffer 362-1 of FIG. 10) at a stage prior to the first elementary buffer, and the second system target decoder has a transport buffer (for example, a transport buffer 362-2 of FIG. 10) at a stage prior to the second elementary buffer and has a third elementary buffer (for example, an FIFO buffer 391 of FIG. 10) at a stage subsequent to the second elementary.

The timing value (for example, an input timing) of the multiplexing apparatus according to an embodiment of the present invention is a value represented by a sampling period of audio information, at which the unit of an audio stream is passed to the third elementary buffer.

The multiplexing method according to an embodiment of the present invention for use with a multiplexing apparatus (for example, a transmission apparatus 111 of FIG. 4) for multiplexing audio data into transport stream (TS) packets, the multiplexing method including the steps of: encoding (for example, step S52 of FIG. 12) the audio data by a first encoding method, which is a predetermined encoding method; encoding (for example, step S53 of FIG. 12) the audio data by a second encoding method, which is a variable-length encoding method and which differs from the first encoding method, for attaching a timing value (for example, input timing) indicating a timing used when audio data is decoded in units (for example, audio access units) of predetermined audio data; packetizing (for example, step S59 of FIG. 13) the audio data encoded in the first encoding step and the audio data encoded in the second encoding step into TS packets and attaching the same ID (for example, a PID) to a plurality of packetized TS packets; determining (for example, step S60 of FIG. 13) a TS packet to be multiplexed from among the plurality of TS packets packetized in the packetization step; and multiplexing (for example, step S61 of FIG. 13) the TS packets determined in the determination step, wherein the determination step assumes a first system target decoder (for example, a system target decoder 121 in which a BS audio data decoding processing section 360-1 of FIG. 10 is applied to an audio data decoding processing section 360 of FIG. 9) for decoding the audio data encoded in the first encoding step, and a second system target decoder (for example, a system target decoder 121 in which an HQ audio data decoding processing section 360-2 of FIG. 10 is applied to an audio data decoding processing section 360 of FIG. 9) for decoding the audio data encoded in the second encoding step on the basis of the timing value attached to the audio data encoded in the second encoding step, and determines a TS packet to be multiplexed.

The program according to an embodiment of the present invention is a program for multiplexing audio data into transport stream (TS) packets, the program enabling a computer to perform processing including the steps of: encoding (for example, step S52 of FIG. 12) the audio data by a first encoding method, which is a predetermined encoding method; encoding (for example, step S53 of FIG. 12) the audio data by a second encoding method, which is a variable-length encoding method and which differs from the first encoding method, for attaching a timing value (for example, an input timing) indicating a timing used when audio data is decoded in units (for example, audio access units) of predetermined audio data; packetizing (for example, step S59 of FIG. 13) the audio data encoded in the first encoding step and the audio data encoded in the second encoding step into TS packets and attaching the same ID (for example, a PID) to a plurality of packetized TS packets;

determining (for example, step S60 of FIG. 13) a TS packet to be multiplexed from among the plurality of TS packets packetized in the packetization step; and multiplexing (for example, step S61 of FIG. 13) the TS packets determined in the determination step, wherein the determination step assumes a first system target decoder (for example, a system target decoder 121 in which a BS audio data decoding processing section 360-1 of FIG. 10 is applied to an audio data decoding processing section 360 of FIG. 9) for decoding the audio data encoded in the first encoding step, and a second system target decoder (for example, a system target decoder 121 in which an HQ audio data decoding processing section 360-2 of FIG. 10 is applied to an audio data decoding processing section 360 of FIG. 9) for decoding the audio data encoded in the second encoding step on the basis of the timing value attached to the audio data encoded in the second encoding step, and determines a TS packet to be multiplexed.

The recording medium (for example, a removable medium 113 of FIG. 3) according to an embodiment of the present invention is a recording medium (for example, a removable medium 113 of FIG. 3) having recorded thereon multiplexed transport stream (TS) packets, wherein a plurality of TS packets in which audio data encoded by a first encoding method, which is a predetermined encoding method, are packetized into TS packets, and a plurality of TS packets in which audio data encoded by a second encoding method, which is a variable-length encoding method and which differs from the first encoding method, for attaching a timing value (for example, an input timing) indicating a timing used when audio data is decoded in units (for example, an audio access units) of predetermined audio data, are multiplexed (for example, a BS audio TS 173 and an HQ audio TS 183 are multiplexed into a TS 190) and are recorded, wherein the TS packets are TS packets that are determined to be multiplexed by assuming a first system target decoder (for example, a system target decoder 121 in which a BS audio data decoding processing section 360-1 of FIG. 10 is applied to an audio data decoding processing section 360 of FIG. 9) for decoding the audio data encoded by the first encoding method and a second system target decoder (for example, a system target decoder 121 in which an HQ audio data decoding processing section 360-2 of FIG. 10 is applied to an audio data decoding processing section 360 of FIG. 9) for decoding the audio data on the basis of the timing value attached to the audio data encoded by the second encoding method.

Embodiments of the present invention will now be described below with reference to the drawings.

Figure 1:
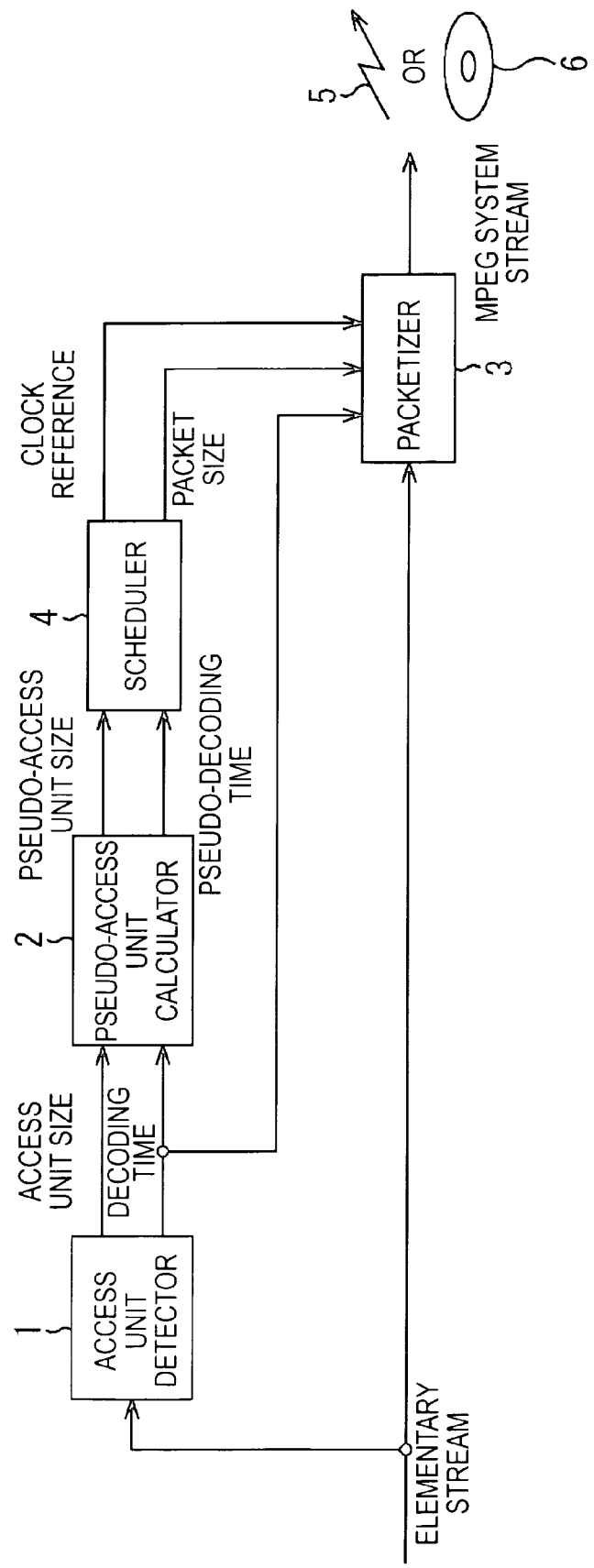
FIG. 1 shows the configuration of an encoding apparatus of the related art.
Figure 2:
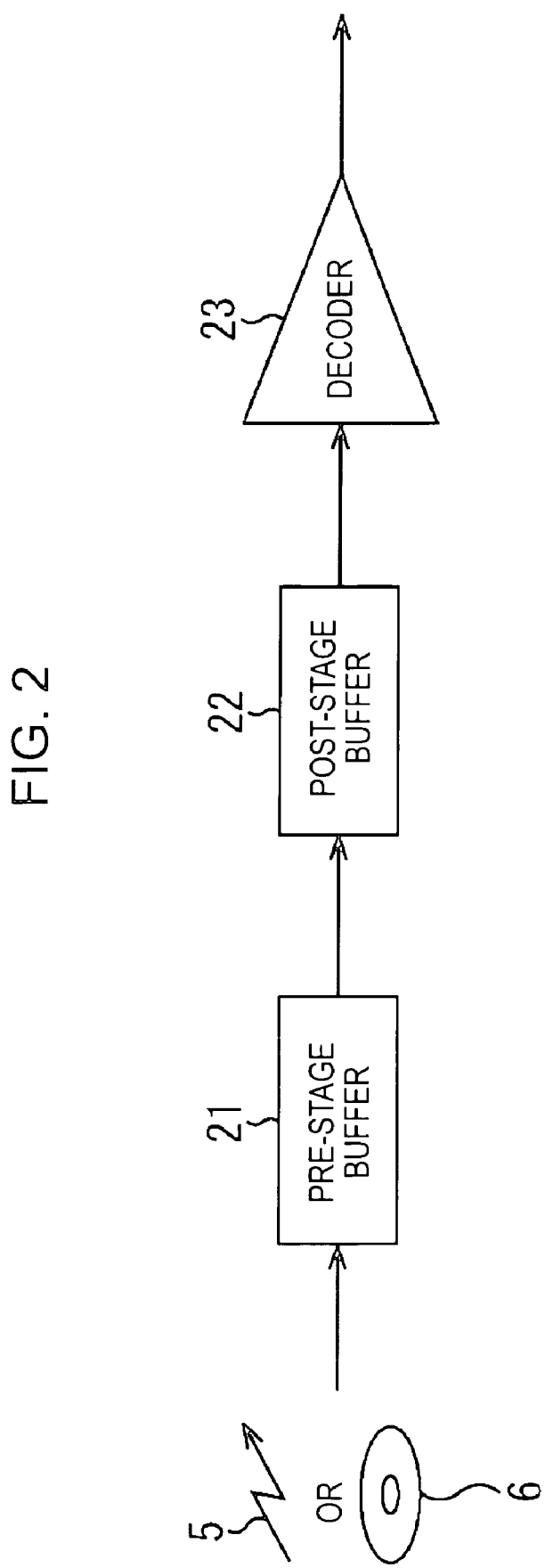
FIG. 2 shows an system target decoder (STD) model assumed by an encoding apparatus of FIG. 1.
Figure 3:
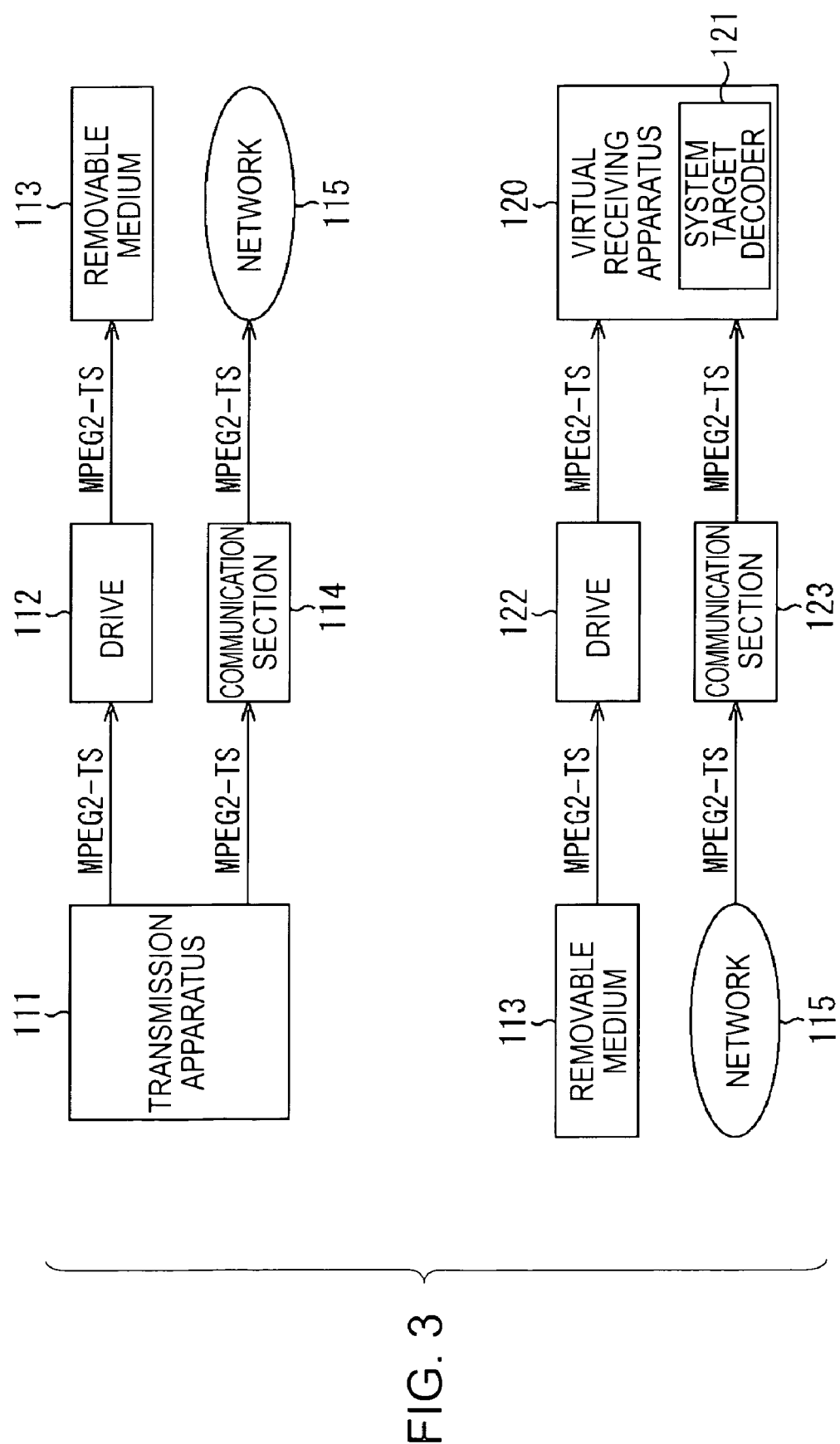
FIG. 3 illustrates constraints when a transmission apparatus to which an embodiment of the present invention is applied encodes an audio stream by using an MPEG (Moving Picture Experts Group) 2-TS (transport stream) method.

FIG. 3 illustrates constraints when a transmission apparatus 111 to which an embodiment of the present invention is applied transmits an audio stream by using an MPEG (Moving Picture Experts Group) 2-TS (transport stream) system (hereinafter referred to as an "MPEG2-TS").

The transmission apparatus 111 is, for example, an apparatus for packetizing a stream into TS packets in order to generate an MPEG2-TS (MPEG2 transport stream) by using an MPEG2-TS system and for transmitting it. For example, the transmission apparatus 111 records the generated MPEG2-TS on a removable medium 113 via a drive 112 and transmits it to a network 115 by controlling a communication section 114. At this time, when a video stream and/or an audio stream are packetized into TS packets by using the MPEG2-TS system, the transmission apparatus 111 assumes a system target decoder 121 provided in a virtual receiving device 120 as a standard model of a decoder (system target decoder (STD)), and generates an MPEG2-TS so that a decoding process can be correctly performed on the system target decoder. The virtual receiving device 120, which is connected to a drive 122, is assumed to read the MPEG2-TS recorded on the removable medium 113 via the drive 122 and to obtain an MPEG2-TS via the network 115 by controlling the communication section 123. The removable medium 113 is formed of a magnetic disk, a optical disc, a magneto-optical disc, or a semiconductor memory. An example of the configuration of the system target decoder 121 will be described later with reference to FIGS. 9 and 10.

Figure 4:
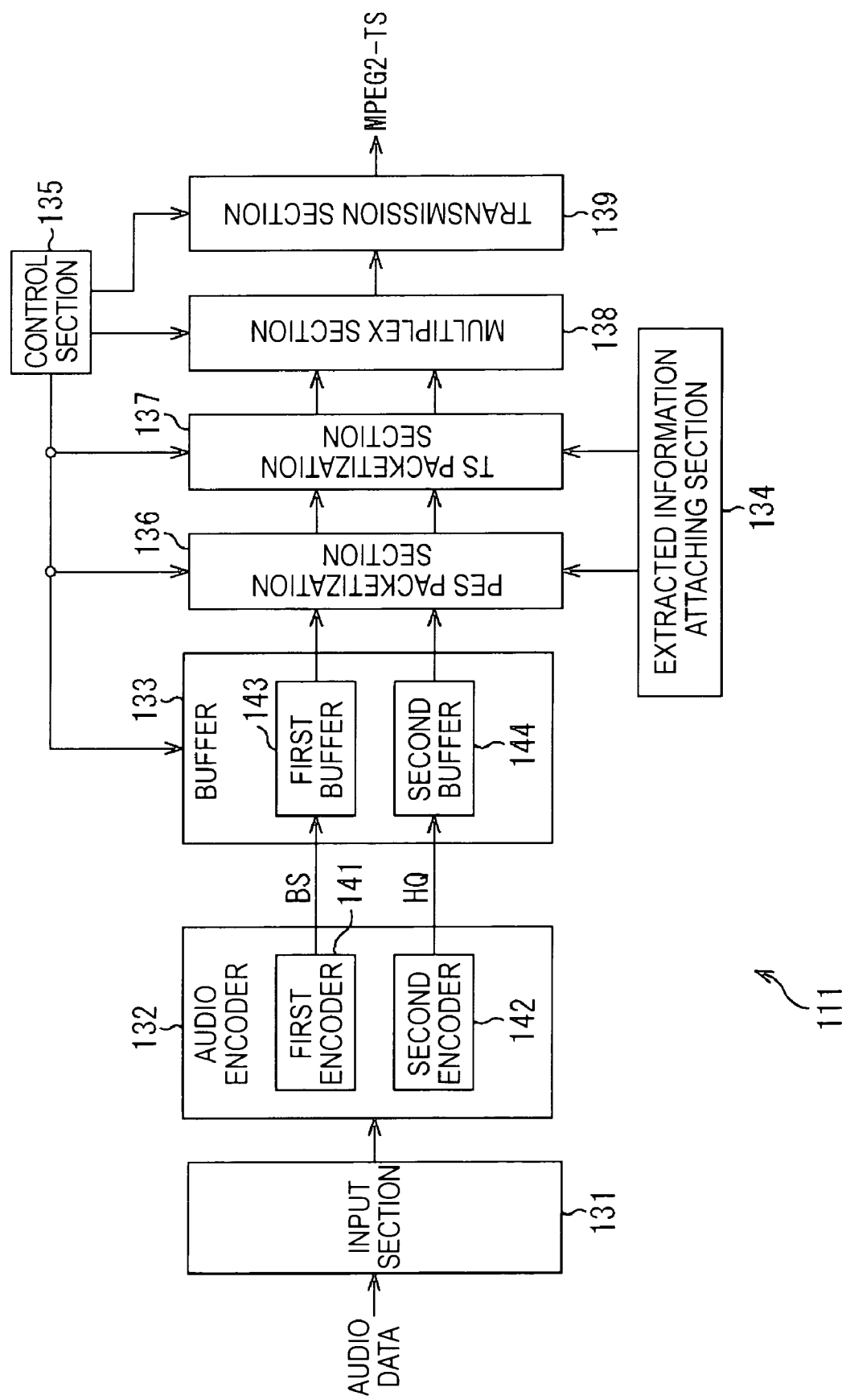
FIG. 4 shows an example of the configuration of the transmission apparatus of FIG. 3.

FIG. 4 is a block diagram showing an example of the configuration of the transmission apparatus 111 of FIG. 3. A description is given below by assuming that, in FIG. 4, the transmission apparatus 111 encodes an audio stream, packetizes it into TS packets (MPEG2-TS packets), and transmits them.

The transmission apparatus 111 is provided with an input section 131, an audio encoder 132, a buffer 133, an extracted information attaching section 134, a control section 135, a PES (Packetized Elementary Stream) packetization section 136, a TS packetization section 137, a multiplexing section 138, and a transmission section 139. Furthermore, the audio encoder 132 is provided with a first encoder 141 and a second encoder 142. Furthermore, the buffer 133 is provided with a first buffer 143 and a second buffer 144.

Audio data to be transmitted is input to the input section 131. The input section 131 supplies the input audio data to the first encoder 141 and the second encoder 142 of the audio encoder 132.

The first encoder 141 is an encoder for encoding audio data by an audio encoding method (for example, a fixed-length encoding method), by which the audio data can be decoded by a general-purpose audio decoder. The second encoder 142 is an encoder for encoding audio data by an audio encoding method (variable-length encoding method), by which the data can be decoded by only a high-performance audio decoder. More specifically, the second encoder 142, which is a variable bit rate (VBR) audio encoder, performs encoding by using an audio encoding method employing an FIFO (First-In First-Out) buffer for minimizing the peak rate of the VBR during decoding. Furthermore, the second encoder 142 attaches, during encoding, a timing value indicating the time represented by the sampling period of audio information at which the audio access unit is passed to an FIFO buffer (an FIFO buffer 391 (to be described later) of FIG. 10) of the system target decoder. In the following, the timing value indicating the time represented by the sampling period of audio information at which the audio access unit is passed to the FIFO buffer of the system target decoder, which is attached by the second encoder 142 during encoding, will also be referred to as an input timing. The first encoder 141 does not attach an input timing during encoding.

Here, the second encoder 142 performs encoding by using an encoding method with higher performance than that of the first encoder 141. As a result, the playback quality of the audio and the functionality when the audio stream as a result of being encoded by the second encoder 142 is decoded and played back become higher than those when the audio stream as a result of being encoded by the first encoder 141 is decoded and played back.

In the following, the encoding method used by the first encoder 141 is referred to as a "first encoding method", and the encoding method used by the second encoder 142 is referred to as a "second encoding method". The second encoding method, which is a variable bit rate (VBR) audio encoding method, is an audio encoding method using an FIFO (First-In First-Out) buffer for minimizing the peak rate of the VBR during decoding. That is, the second encoding method is a variable-length encoding method, and when an audio ES encoded by this method is to be decoded, an FIFO buffer is necessary on the decoding side. Here, the output bit rate of the audio stream that is encoded by the variable-length encoding method and that is output is made to be a variable length. On the contrary, the output bit rate of the audio stream that is encoded by the fixed-length encoding method and that is output is made to be a fixed length. In the following, the stream obtained by the first encoder 141 by encoding audio data using the first encoding method will be referred to as a BS audio ES (basic audio elementary stream). The stream obtained by the second encoder 142 by encoding audio data using the second encoding method will be referred to as an HQ audio ES (high-quality audio elementary stream).

The first encoder 141 encodes the audio data supplied from the input section 131 by using the first encoding method and supplies the resultant BS audio ES to the first buffer 143 of the buffer 133. The second encoder 142 encodes the audio data supplied from the input section 131 by using the second encoding method and supplies the resultant HQ audio ES to the second buffer 144 of the buffer 133. As described above, the first buffer 143 stores (buffers) the BS audio ES, and the second buffer 144 stores (buffers) the HQ audio ES. Then, under the control of the control section 135, each of the first buffer 143 and the second buffer 144 reads the audio stream stored therein at a predetermined timing and supplies it to the PES packetization section 136.

The control section 135 monitors the BS audio ES and the HQ audio ES that are stored in the first buffer 143 and the second buffer 144, respectively, and controls each section of the PES packetization section 136, the TS packetization section 137, the multiplexing section 138, and the transmission section 139. Furthermore, the control section 135 manages a PTS (Presentation Time Stamp) and supplies a PID (Packet Identification) to be attached to the TS packets to the TS packetization section 137. Furthermore, the control section 135 assumes the system target decoder 121 (to be described later) of FIGS. 9 and 10 as a system target decoder, calculates the amount of occupied buffer of the system target decoder 121, and determines a TS packet to be multiplexed from among the plurality of TS packets packetized by the TS packetization section 137. That is, the control section 135 determines (controls) a TS packet to be multiplexed by the multiplexing section 138 on the basis of the calculation of the amount of occupied buffer of the system target decoder 121.

The PES packetization section 136 extracts the BS audio ES stored in the first buffer 143 and the HQ audio ES stored in the second buffer 144 at a timing based on the control from the control section 135, and packetizes them into PES packets under the control of the control section 135. At this time, the PES packetization section 136 stores the PTS supplied from the control section 135 in each of the PES packets of the PES. That is, the PTS is stored in each of the PES packets (the PES packets corresponding to the BS audio ES and the PES packets corresponding to the HQ audio ES) output from the PES packetization section 136.

In this embodiment, it is assumed that each of a plurality of PES packets (BS audio PES packets) generated on the basis of the BS audio ES is continuously supplied from the TS packetization section 136 to the TS packetization section 137 in a predetermined order. In this case, as a result, one stream (hereinafter referred to as a "BS audio PES") formed of a plurality of BS audio PES packets is supplied from the PES packetization section 136 to the TS packetization section 137.

It is also assumed that each of a plurality of PES packets (HQ audio PES packets) generated on the basis of the HQ audio ES is continuously supplied from the TS packetization section 136 to the TS packetization section 137 in a predetermined order. In this case, as a result, one stream (hereinafter referred to as an "HQ audio PES") formed of a plurality of HQ audio PES packets is supplied from the PES packetization section 136 to the TS packetization section 137.

The extracted information attaching section 134 supplies an ID (Identification) that is uniquely attached to each type of the BS audio stream and the HQ audio stream to the TS packetization section 137 so that the BS audio stream and the HQ audio stream (that is, streams encoded by different encoding methods) can be extracted on the decoding side (on the virtual receiving device 120 side in FIG. 3). That is, the extracted information attaching section 134 supplies identification information (ID) for identifying each of the BS audio stream and the HQ audio stream to the TS packetization section 137.

For this ID, for example, a transport_priority flag in a transport packet header can be used. The extracted information attaching section 134 supplies, to the TS packetization section 137, information (extracted information) in which transport_priority=1 is set to the transport packet for transmitting a BS audio stream and transport_priority=0 is set to the transport packet for transmitting an HQ audio stream.

Under the control of the control section 135, the TS packetization section 137 packetizes the PES packet stream supplied from the PES packetization section 136 into TS packets (transport stream packets). More specifically, the TS packetization section 137 packetizes the BS audio PES supplied from the PES packetization section 136 into TS packets, and packetizes the HQ audio PES supplied from the PES packetization section 136 into TS packets. At this time, an ID (for example, a transport_priority flag) is supplied from the extracted information 134 to the TS packetization section 136, and also, a PID is supplied thereto from the control section 135. In this embodiment, the PID is made to be the same ID between the BS audio stream and the HQ audio stream. That is, when audio TS packets encoded by two different encoding methods are multiplexed into one audio stream, a PID is attached so that it becomes the same ID for the whole of this one audio stream. The TS packetization section 137 generates TS packets so that the extracted information (for example, the transport_priority flag) supplied from the extracted information attaching section 134, and the PID supplied from the control section 135 are contained (so as to be contained in the header of the TS packets). In the following, the result in which the BS audio PES is packetized will be referred to as BS audio TS packets, and the result in which the HQ audio PES is packetized will be referred to as HQ audio TS packets. In the BS audio TS packets and the HQ audio TS packets, the extracted information (for example, the transport_priority flag) attached to each TS packet differs, but the PID is the same.

The multiplexing section 138 multiplexes the TS packets supplied from the TS packetization section 137 under the control of the control section 135. More specifically, the multiplexing section 138 multiplexes the BS audio TS packets and the HQ audio TS packets supplied from the TS packetization section 137 under the control of the control section 135, and generates one audio stream (MPEG2-TS) in which the PID is the same. The order of the TS packets multiplexed by the multiplexing section 138 will be described later with reference to FIGS. 12 to 15. The multiplexing section 138 transmits the MPEG2-TS generated as a result of being multiplexed to the transmission section 139 at a subsequent stage.

The transmission section 139 transmits the MPEG2-TS supplied from the multiplexing section 138. For example, as shown in FIG. 3, the transmission section 139 controls the drive 112 so that the MPEG2-TS is recorded on the removable medium 113 or controls the communication section 114 so as to transmit the MPEG2-TS to an external device via the network 115.

The extracted information attaching section 134 may not only supply an ID as extracted information to the TS packetization section 137, but also may further transmit extracted information to the PES packetization section 136. For example, the extracted information attaching section 134 supplies an ID of a unique value that is uniquely attached to each type of the BS audio stream and the HQ audio stream to the PES packetization section 146 so that the stream of each type of the BS audio stream and the HQ audio stream can be extracted on the decoding side (for example, on the virtual receiving device 121 side of FIG. 3).

In this embodiment, for this ID, stream_id or stream_id_extension is used. The stream_id refers to stream_id in the PES packet header, which is specified by the MPEG2 systems standard. The stream_id_extension refers to stream_id_extension in the PES packet header, which is specified by the MPEG2 systems standard Amendment2 (2003). When the audio stream is a stream other than MPEG Audio (MPEG-1/-2 Audio or MPEG AAC), stream_id_extension is suitably used. When the stream_id_extension is used, the MPEG2 systems standard Amendment2 (2003) specifies that "1111 1101" (value meaning extended_stream_id) is set to the stream_id. Furthermore, the MPEG2 systems standard Amendment2 (2003) specifies that the stream_id_extension of a unique value for identifying the type of stream (the BS audio stream and the HQ audio stream) can be used.

When the extracted information attaching section 134 supplies a stream ID (for example, stream_id_extension) to the PES packetization section 136, the PES packetization section 146 packetizes each of the obtained BS audio stream and HQ audio stream so that one corresponding stream ID (for example, stream_id_extension) among stream IDs supplied from the extracted information attaching section 134 is contained in the PES packets. Each stream ID of each PES packet is used to identify the type of the corresponding PES packets. Here, the type of the PES packets is one of the BS audio stream and the HQ audio stream. For example, the PES packets of the type of the BS audio stream refers to PES packets in which at least some data of the BS audio stream (the BS audio ES) is contained. Therefore, in order for the virtual receiving device 120 of FIG. 3 on the reception side to select the PES packets of the desired audio stream type, the value of the stream ID attached to the PES packets may need only to be recognized.

Figure 5:
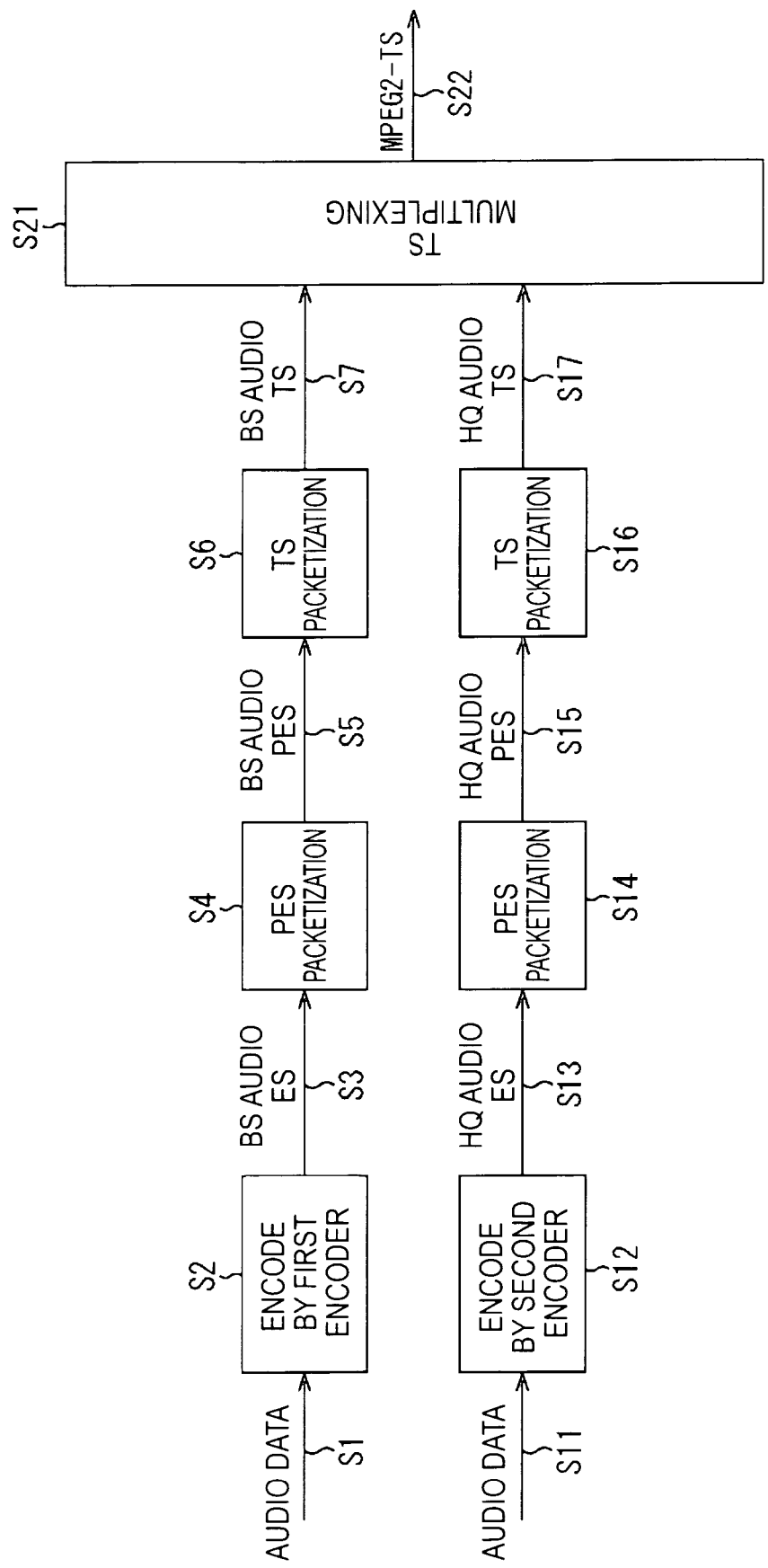
FIG. 5 illustrates the flow of data of a basic audio elementary stream (BS audio ES) and a high-quality audio elementary stream (HQ audio ES)

Next, a description will be briefly given, with reference to the flowchart of FIG. 5, of an example of the flow of data (stream) in the transmission apparatus 111 of FIG. 4.

The input section 131 supplies input audio data to the first encoder 141 in step S1, and supplies it to the second encoder 142 in step S11. The first encoder 141 encodes the input audio data in step S2, and supplies the BS audio ES to the PES packetization section 136 in step S3. The PES packetization section 136 packetizes the BS audio ES supplied from the first encoder 141 into PES packets in step S4, and supplies the BS audio PES to the TS packetization section 137 in step S5. The TS packetization section 137 packetizes the BS audio PES supplied from the PES packetization section 136 into TS packets in step S6, and supplies the BS audio TS to the multiplexing section 138 in step S7. Furthermore, similarly, the second encoder 142 encodes the input audio data in step S12, and supplies the HQ audio ES to the PES packetization section 136 in step S13. The PES packetization section 136 packetizes the HQ audio ES supplied from the second encoder 142 into PES packets in step S14, and supplies HQ audio PES to the TS packetization section 137 in step S15. The TS packetization section 137 packetizes the HQ audio PES supplied from the PES packetization section 136 into TS packets in step S16, and supplies the HQ audio TS to the multiplexing section 138 in step S17. In step S21, the multiplexing section 138 multiplexes the BS audio TS and the HQ audio TS, which are supplied from the processes of step S7 and step S17, generates one MPEG2-TS (transport stream), and in step S22, outputs the generated MPEG2-TS (in the case of FIG. 4, output to the transmission section 139).

As described above, the BS audio ES obtained as a result of being encoded by the first encoder 141 and the HQ audio ES obtained as a result of being encoded by the second encoder 142 are packetizes into PES packets independently of each other (step S4 and step S14), are packetized into TS packets (step S6 and step S16), are multiplexed by the multiplexing section 138 so as to be formed as one audio stream (transport stream).

A more specific example will now be described with reference to FIG. 6. Processes in FIG. 6, which correspond to those in FIG. 5, are designated with the same step numbers.

Figure 6:
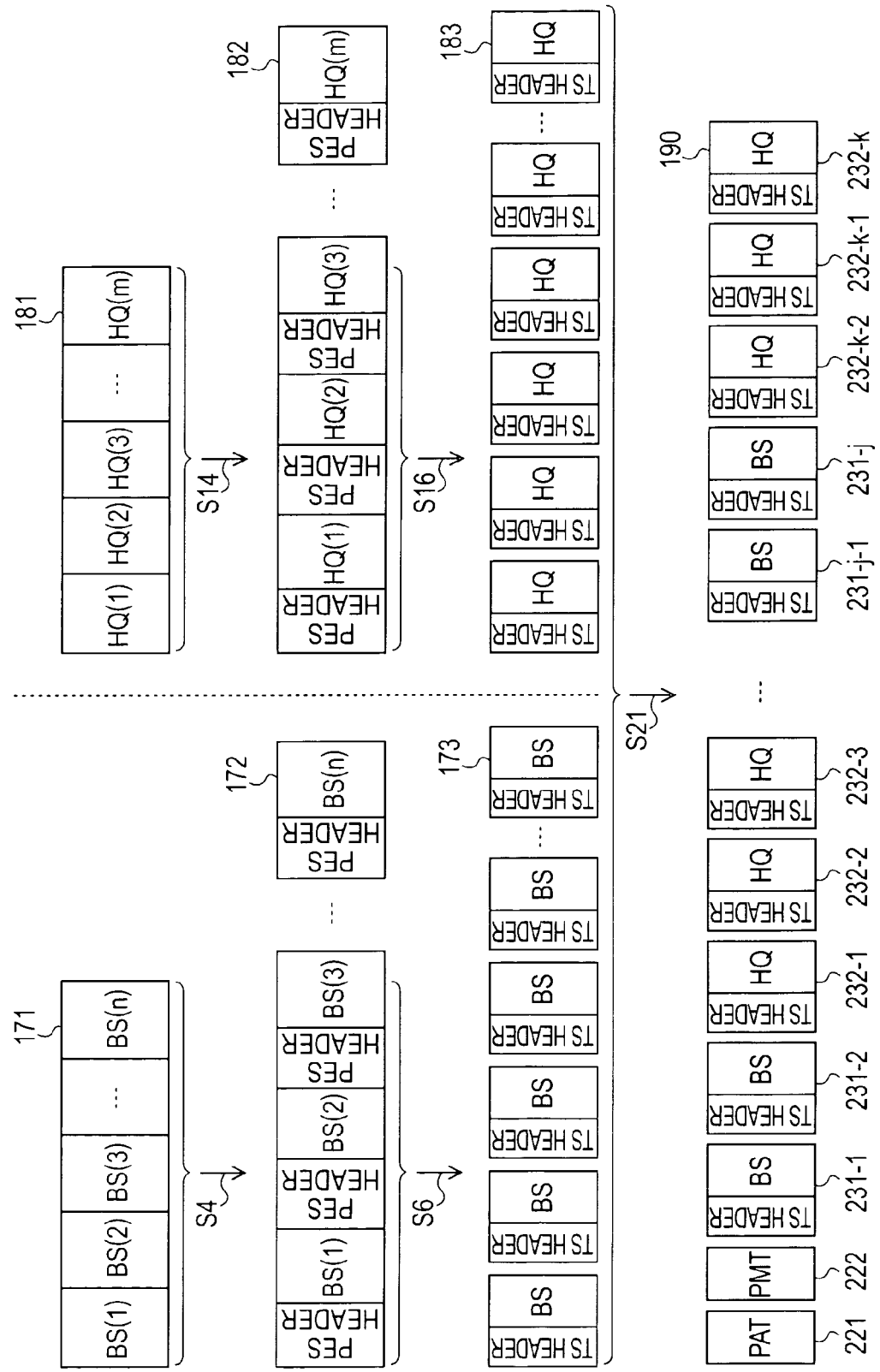
FIG. 6 illustrates an example of the structure of the data of the BS audio ES and the HQ audio ES.

In the example of FIG. 6, the first stage indicates a BS audio ES 171 and an HQ audio ES 181. The second stage indicates a BS audio PES 172 and an HQ audio PES 182. The third stage indicates a BS audio TS 173 and an HQ audio TS 183. The fourth stage indicates a TS (transport stream) 190.

The BS audio ES 171 indicates a state in which a stream is encoded and output by the first encoder 141 of FIG. 4. The BS audio PES 172 indicates a state in which the stream is packetized into PES packets (step S4) and is output by the PES packetization section 136 of FIG. 4. The BS audio TS 173 indicates a state in which the stream is packetized into TS packets (step S6) and is output by the TS packetization section 137 of FIG. 4. The HQ audio ES 181 indicates a state in which a stream is encoded and output by the second encoder 142 of FIG. 4. The HQ audio PES 182 indicates a state in which the stream is packetized into PES packets (step S14) and is output by the PES packetization section 136 of FIG. 4. The HQ audio TS 183 indicates a state in which the stream is packetized into TS packets (step S16) and is output by the TS packetization section 137 of FIG. 4. The TS 190 indicates a state in which the streams are multiplexed (step S21) and are output by the multiplexing section 138 of FIG. 4.

Both the BS audio ES 171 and the HQ audio ES 181 are encoded by using a predetermined number of audio samples as one unit, and are indicated by being divided with a subscript indicated by parentheses for each unit. More specifically, for example, the BS audio ES 171 is separated into a plurality of units (audio access units) and are encoded as BS(1), BS(2), ..., and BS(n) (n is an arbitrary natural number). Similarly, for example, the HQ audio ES 181 is separated into a plurality of units (audio access units) and are encoded as HQ1(1), HQ(2), ..., and HQ(m). The "audio access units" are encoding units constituting the audio ES, and are also decoding units. For example, when one audio access unit of the BS audio ES is played back, the playback time is 32 milliseconds. When one audio access unit of the HQ audio ES is played back, the playback time is a $\frac{1}{1200}$ of a second.

The PES packetization section 136 of FIG. 4 packetizes the BS audio ES 171 and the HQ audio ES 181 into PES packets of each different stream ID. For example, the PES packetization section 136 sets the stream ID of the PES packets corresponding to the BS audio ES 171 as "stream_id_extension=b1" and contains the stream ID in the PES header of the PES packets to be generated. Furthermore, for example, the PES packetization section 136 sets the stream ID of the PES packets corresponding to the HQ audio ES 181 as "stream_id_extension=b2" and contains the stream ID in the PES header of the PES packets to be generated. In this manner, the PES packetization section 136 generates the BS audio PES 172 and the HQ audio PES 182 shown in FIG. 6 and supplies them to the TS packetization section 137.

In comparison, the TS packetization section 137 packetizes each of the PES packets constituting the BS audio PES 172 into TS packets, and also packetizes each of the PES packets constituting the HQ audio PES 182 into TS packets. At this time, the TS packetization section 137 attaches a transport_priority flag for identifying the BS audio PES 172 and the HQ audio PES 182 and a PID for identifying an audio stream to the header (the TS header) of the TS packets. That is, the PID stored in each TS header of the plurality of TS packets constituting the generated BS audio TS 173 and the PID stored in each TS header of the plurality of TS packets constituting the HQ audio TS 183 are identical PIDs. The transport_priority flag stored in each TS header of the TS packets constituting the generated BS audio TS 173 and the transport_priority flag stored in each TS header of the plurality of TS packets constituting the HQ audio TS 183 are different transport_priority flags.

Figure 7:
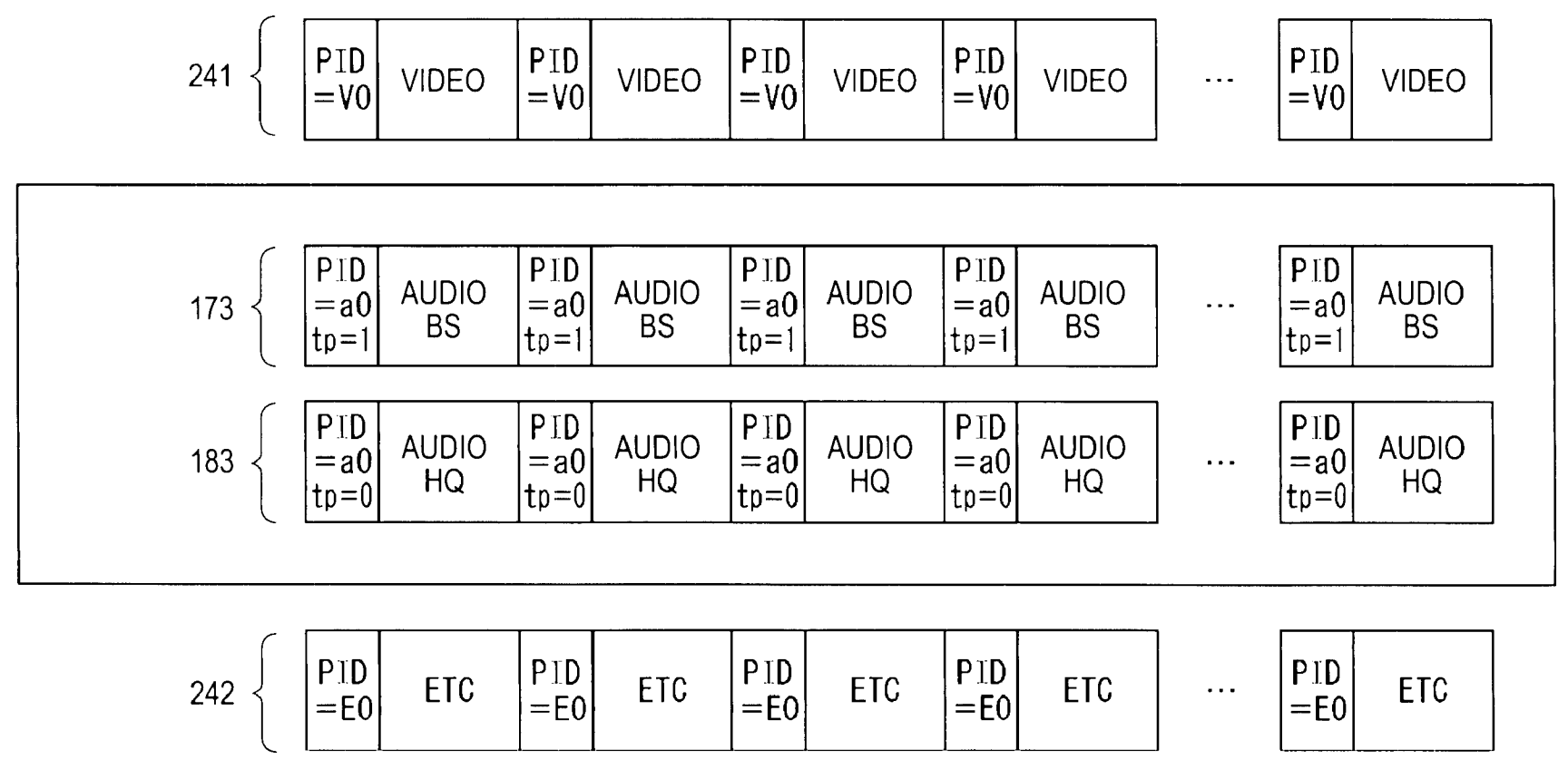

More specifically, as shown in the second and third stages of FIG. 7, the TS packetization section 137 attaches "PID=a0, tp (transport_priority)=1" to each TS header of a plurality of BS audio TS packets constituting the BS audio TS 173 and attaches "PID=a0, tp (transport_priority)=0" to each header of a plurality of BS audio TS packets constituting the HQ audio TS 183.

In the description up to FIG. 6, a case in which the transmission apparatus 111 of FIG. 4 transmits audio data has been described. In practice, however, the transmission apparatus 111 of FIG. 4 also transmits video data and system data (data of a graphics stream and a text subtitle stream) as data other than audio data. Also, in this case, video data is encoded by a video encoder (not shown), is packetized into PES packets so as to be formed as TS packets, and thereafter is multiplexed together with audio TS packets by the multiplexing section 138. At this time, the PID differs between the TS packets corresponding to the video data and the TS packets corresponding to the audio data, as shown in FIG. 7 (of course, the PIDs of the BS audio TS packets and the HQ audio TS packets are the same). In the case of the example of FIG. 7, in the header of each of the TS packets contained in the TS of video data (video ES) 241, "PID=V0" is attached as indicated at the first stage, and in the header of each of the TS packets contained in the TS of other data 242, "PID=E0" is attached as indicated at the fourth stage. As described above, one program stream contains a stream having one or more different PIDs.

That is, streams, which are separate as a video TS 241, a BS audio TS 173, an HQ audio TS 283, and other TS 242, are input to the multiplexing section 138. Here, the BS audio ES and the HQ audio ES are streams that are independent of each other, and do not have a hierarchical relationship. For this reason, there are no constraints when multiplexing is performed (for example, there are no constraints of multiplexing the BS audio ES and the HQ audio ES as a set). Furthermore, in this embodiment, a transport stream is generated with the same PID being attached to the audio ES encoded by different encoding methods.

The multiplexing section 138 multiplexes the BS audio TS 173 and the HQ audio TS 183 under the control of the control section 135, and generates one transport stream (MPEG2-TS) 190. In the example of FIG. 6, the TS (MPEG2-TS) 190 is formed to include TS packets 221 corresponding to the PAT (Program Association Table), TS packets 222 corresponding to a PMT (Program Map Table), BS audio TS 231-1 to 231-$j$ ($j$ is an arbitrary natural number), and HQ audio TS 232-1 to 232-$k$ ($k$ is an arbitrary natural number).

As described above, the same PID is attached to one audio stream (TS 190), and a different tp (transport_priority) is attached to each of the BS audio ES and the HQ audio ES contained in one stream.

Figure 8:
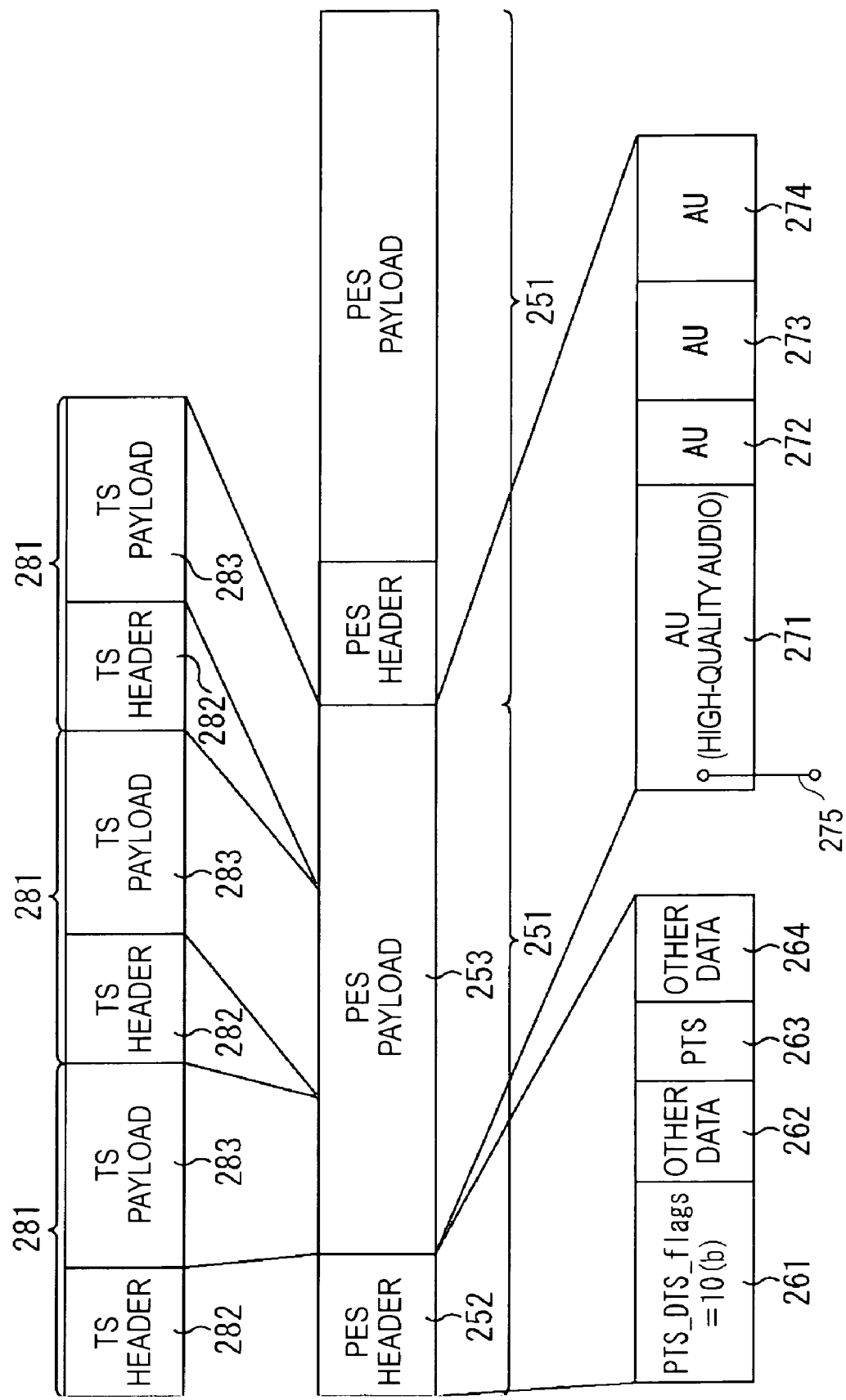
FIG. 8 illustrates an example of the structure of data of a packetized elementary stream (PES) packet and a TS packet.

Next, a description will be given, with reference to FIG. 8, of examples of data structure when the HQ audio ES 181 is packetized into PES packets and when these are further packetized into TS packets.

A PES packet 251 obtained by packetizing the HQ audio ES 181 into PES packets contains a PES header 252 and a PES payload 253. The PES header 252 contains PTS_DTS_flags 261, other data 262, a PTS 263, and other data 264.

When the value of the PTS_DTS_flags is "00(b)", this indicates that the fields of the PTS and the DTS do not exist in the PES header 252. When the value of the PTS_DTS_flags is "10(b)", this indicates that only the field of the PTS exists in the PES header 252. When the value of the PTS_DTS_flags is "11(b)", this indicates that fields of the PTS and the DTS exist in the PES header 252. In the case of the example of FIG. 8, the value of the PTS_DTS_flags 261 is set as PTS_DTS_flags=10(b). That is, this indicates that, in FIG. 8, only the value of the PTS exists in the PES header 252, the value of the DTS does not exist, and the value of the PTS is described in the field of the PTS 263.

Furthermore, the PES payload 253 contains AUs (audio units) 271 to 274. The AU 271 is high-quality audio unit and has input timing information 275 contained therein. This input timing (timing value) is stored in the PES payload 253 (AU 271) where the beginning data of the audio access unit is stored. As described above, input timing (input timing) is a timing value indicating the time represented by the sampling period of audio information at which an audio access unit is passed to the FIFO buffer of the system target decoder, the timing value being attached by the second encoder 142 during encoding.

The TS packet 281 obtained as a result of the HQ audio PES 182 being packetized into TS packets contain a TS header 282 and the TS payload 283. Although not shown in FIG. 8, a PID and a tp shown in FIG. 7 are attached to the TS header 282. As shown in FIG. 8, the data of the PES payload 253 of the PES packet 251 is stored in the TS payload 283 of the TS packet 281, and is packetized into a TS packet.

In this manner, the timing value (input timing) that is attached when the second encoder 142 performs encoding is stored in the PES payload 253 where the beginning data of the audio access unit is stored. For example, the data length of the PTS 263 is set as 33 bits, the data length of the DTS is set as 33 bits, and the data length of the input timing is set as 16 bits.

In this embodiment, when the transmission apparatus 111 packetizes the BS audio ES and the HQ audio ES into TS packets and multiplexes a plurality of BS audio TS packets forming the resultant BS audio TS and a plurality of HQ audio TS packets forming the HQ audio TS into one transport stream 190 (MPEG2-TS), the transmission apparatus 111 determines TS packet to be multiplexed on the basis of the performance of the virtual receiving apparatus 120 (FIG. 3). That is, even when the virtual receiving apparatus 120 is a virtual receiving apparatus in compliance with both the BS audio ES and the HQ audio ES (capable of decoding both the BS audio ES and the HQ audio ES) or even when the virtual receiving apparatus 120 is a virtual receiving apparatus in compliance with only the BS audio ES (capable of decoding only the BS audio ES), the transmission apparatus 111 adjusts the timing at which the TS packets are multiplexed (sequentially determines the TS packet to be multiplexed) so that decoding becomes possible without the buffer provided in the virtual receiving apparatus 120 overflowing or underflowing.

More specifically, the transmission apparatus 111 adjusts the TS packet to be multiplexed in such a manner as to correspond to a virtual receiving apparatus capable of decoding the BS audio TS 173 of FIG. 6 (hereinafter referred to as a "first virtual receiving apparatus") and a receiving apparatus capable of decoding the HQ audio TS 183 of FIG. 6 (hereinafter referred to as a "second virtual receiving apparatus"), and generates the transport stream 190 of FIG. 6. That is, the transmission apparatus 111 determines the TS packet to be multiplexed so that the decoder buffer for BS audio ES of a predetermined size does not overflow or underflow when the virtual receiving apparatus 120 extracts and decodes the BS audio ES and the decoder buffer for or the HQ audio ES of a predetermined size does not overflow or underflow when the virtual receiving apparatus 120 extracts and decodes the HQ audio ES.

That is, two types of virtual receiving apparatuses when the virtual receiving apparatus 120 can decode only the BS audio ES and when the virtual receiving apparatus 120 can decode the HQ audio ES are assumed. Then, the timing at which the TS packets are multiplexed is adjusted so that the TS 190 that is multiplexed in each of the two types of virtual receiving apparatuses (the first virtual receiving apparatus and the second virtual receiving apparatus) can be decoded.

FIG. 9 illustrates a model of a system target decoder 121 for the purpose of constraining encoding when a BS audio TS and an HQ audio TS are to be multiplexed. That is, an example of the configuration of a model of a system target decoder 121 (FIG. 3) possessed by the virtual receiving apparatus 120, which is assumed when the transmission apparatus 111 multiplexes the BS audio TS and the HQ audio TS by a MPEG2-TS method, is shown in FIG. 9. In other words, the system target decoder 121 of FIG. 9 is a model of the system target decoder 121 that is assumed when the transmission apparatus 111 multiplexes the BS audio TS and the HQ audio TS.

The MPEG2-TS transmitted to the virtual receiving apparatus 120 (FIG. 3) is supplied to the system target decoder 121. As shown in FIG. 9, the MPEG2-TS supplied to the system target decoder 121 is filtered for each type of TS packet by a filter 341.

More specifically, the MPEG2-TS is formed of a plurality of TS packets with a PID for identifying the TS packet being attached to each of the TS packets. On the basis of the PID attached to each packets forming the MPEG2-TS, the filter 341 supplies the TS packets forming the video stream (in the case of the example of FIG. 7, the TS packet of PID=V0) to a video data decoding processing section 350 for processing the video stream; supplies the TS packet forming the audio stream (in the case of the example of FIG. 7, TS packet of PID=a0) to an audio data decoding processing section 360 for processing the audio stream; and supplies the TS packet related to the system (in the case of the example of FIG. 7, the TS packet of PID=E0) to a system data decoding processing section 370.

The video data decoding processing section 350 is provided with a transport buffer 351 (referred to as "TBv" in the figure), a multiplex buffer 352 (referred to as "MBv" in FIG. 9), an elementary buffer 353 (referred to as "EBv" in FIG. 9), a video decoder (referred to as "Dv" in FIG. 9), and an output reordering buffer 355 (referred to as "Ov" in FIG. 9).

When the TS packets forming the video stream (in the case of the example of FIG. 7, the TS packets of PID=V0) are supplied to the video data decoding processing section 350 via the filter 341, they are stored in the transport buffer 351. Then, data is supplied to the multiplex buffer 352 at a predetermined bit rate. The multiplex buffer 352 stores and smoothes the supplied data and thereafter supplies the data to the elementary buffer 353 at a predetermined bit rate. The video decoder 354 extracts the video access unit stored in the elementary buffer 353 at a predetermined timing, and decodes and outputs it. Some of the decoded data is output from a terminal 356 via the output reordering buffer 355, and the other data is output from a terminal 357 and is reproduced.

The audio data decoding processing section 360 is provided with a transport priority filter (transport priority filter) 361, a transport buffer (referred to as "TBn" in FIG. 9) 362, an elementary buffer (referred to as "Bn" in FIG. 9) 363, and an audio decoder (referred to as "Dn" in FIG. 9) 364.

When the TS packets forming the audio stream (in the case of the example of FIG. 7, the TS packets of PID=a0) are supplied to the audio data decoding processing section 360 via the filter 341, the transport priority filter 361 performs filtering of the TS packets on the basis of the performance of the system target decoder 121. For example, the transport priority filter 361 performs filtering on the basis of the value of the tp (see FIG. 7) attached to the header (for example, the TS header 282 of FIG. 8) of the TS packets. The TS packets filtered by the transport priority filter 361 are supplied to the transport buffer 362 at a subsequent stage. The transport buffer 362 stores the TS packets that are filtered and supplied by the transport priority filter 361.

The TS packets stored in the transport buffer 362 are supplied to the elementary buffer 363 at a rate Rxn in accordance with the performance of the system target decoder 121. Rxn is a leak rate from the transport buffer 362. When data is held in the transport buffer 362, the data is input from the transport buffer 362 to the elementary buffer 363 at a rate of Rxn. When data is not held in the transport buffer 362, Rxn becomes 0.

The elementary buffer 363 stores the data supplied at a bit rate of Rxn from the transport buffer 362. Here, the size of the elementary buffer 363 differs depending on the audio encoding method (MPEG1 audio, MPEG2 AAC audio, etc.). When the data is held in the transport buffer 362, it is supplied at a bit rate (speed) of Rxn from the transport buffer 362. When the data is not held in the transport buffer 362, the data from the transport buffer 362 is not supplied to the elementary buffer 363 (that is, Rxn=0).

The audio decoder 364 extracts the audio access unit stored in the elementary buffer 363 at a predetermined timing, decodes it, outputs it via the terminal 365, and reproduces it. More specifically, the audio decoder 364 extracts the audio access unit from the elementary buffer 363 when the PTS of the audio access unit becomes equal to the time on the system time clock of the T-STD. The audio access unit is an encoding unit constituting the audio stream, and it is a decoding unit. Details of the audio data decoding processing section 360 of FIG. 9 will be described later with reference to FIG. 10.

The system data decoding processing section 370 is provided with a transport buffer (referred to as "TBsys" in FIG. 9) 371, an elementary buffer (referred to as "Bsys" in FIG. 9) 372, and a system decoder (referred to as "Dsys" in FIG. 9) 373.

When the TS packet related to the system (in the case of the example of FIG. 7, the TS packets of PID=E0) are supplied to the system data decoding processing section 370 via the filter 341, they are stored in the transport buffer 371. The data stored in the transport buffer 371 is supplied to the elementary buffer 372. The system decoder 373 extracts the system access unit stored in the elementary buffer 72 at a predetermined timing, decodes it, and outputs it via the terminal 374.

Examples of the TS packets related to the system include the TS packet 221 of the PAT and the TS packet 222 of the PMT of FIG. 6.

Next, referring to FIG. 10, details of the audio data decoding processing section 360 of FIG. 9 will be described.

The interior of the audio data decoding processing section 360 is divided into two systems of a BS audio data decoding processing section 360-1 and an HQ audio data decoding processing section 360-2, as shown in FIG. 10. This is because both an audio data decoding processing section 360-1, which is a decoder model by which only the BS audio ES is to be decoded, and an audio data decoding processing section 360-2, which is a decoder model by which only the HQ audio ES is to be decoded, are verified at one time.

The BS audio data decoding processing section 360-1 is provided with a transport priority filter (referred to as a "transport priority filter (tp=1)" in FIG. 9) 361-1, a transport buffer (referred to as "TB1" in FIG. 9) 362-1, an elementary buffer (referred to as "B1" in FIG. 9) 363-1, and an audio decoder (referred to as "D1" in FIG. 9) 364-1. That is, the transport priority filter 361-1, the transport buffer 362-1, the elementary buffer 363-1, and the audio decoder 364-1 of the audio data decoding processing section 360-1 of FIG. 10 correspond to the transport priority filter 361, the transport buffer 362, the elementary buffer 363, and the audio decoder 364 of the audio data decoding processing section 360 of FIG. 9, respectively.

The transport priority filter 361-1 selects only the TS packets of tp=1 (transport_priority=1) and supplies them to the transport buffer 362-1. The transport buffer 362-1 supplies data by setting the value (Rxn) of the input bit rate to the elementary buffer 363-1 to Rx1. The elementary buffer 363-1 stores the data supplied at a bit rate of Rx1 from the transport buffer 362-1. Here, the capacity (Bn) of the elementary buffer 363-1 is set as B1. The audio decoder 364-1 extracts the audio access unit stored in the elementary buffer 363-1 at a predetermined timing, decodes it, and outputs it. More specifically, the audio decoder 364-1 extracts the audio access unit from the elementary buffer 363-1 when the PTS of the audio access unit becomes equal to the time on the system time clock of the T-STD.

As described above, the BS audio data decoding processing section 360-1 is a system target decoder in which the decoding of the BS audio ES is assumed. In the following, the audio data decoding processing section 360 of the system target decoder 121, which is replaced with the BS audio data decoding processing section 360-1, is referred to as a first system target decoder. That is, the system target decoder provided in the first virtual receiving apparatus is referred to as a first system target decoder.

On the other hand, the HQ audio data decoding processing section 360-2 is provided with a transport priority filter (in FIG. 10, referred to as a transport priority filter (tp=0)) 361-2, a transport buffer (in FIG. 10, referred to as TB2) 362-2, an elementary buffer (in FIG. 10, referred to as B2_1), and a variable bit rate audio decoder 364-2. The variable bit rate audio decoder 364-2 is provided with an FIFO buffer (in FIG. 10, referred to as B2_2) 391 and an audio decoder (in FIG. 10, referred to as D2) 392. In other words, the elementary buffer of the HQ audio data decoding processing section 360-2 is divided into two buffers, that is, an elementary buffer 363-2 and an FIFO buffer 391. That is, the transport priority filter 361-2, the transport buffer 362-2, the elementary buffer 363-2, and the variable bit rate audio data 364-2 of the audio data decoding processing section 360-2 of FIG. 10 correspond to the transport priority filter 361, the transport buffer 362, the elementary buffer 363, and the audio decoder 364 of the audio data decoding processing section 360 of FIG. 9, respectively.

The transport priority filter 361-2 selects only the TS packets of tp=0 (transport_priority=0), and supplies them to the transport buffer 362-2. The transport buffer 362-2 supplies the data with the value (Rxn) of the input bit rate to the elementary buffer 363-2 being set as Rx2. The elementary buffer 363-2 stores the data supplied at a bit rate of Rx2 from the transport buffer 362-2. Here, the capacity (Bn) of the elementary buffer 363-2 is set as B2_1.

Figure 11:
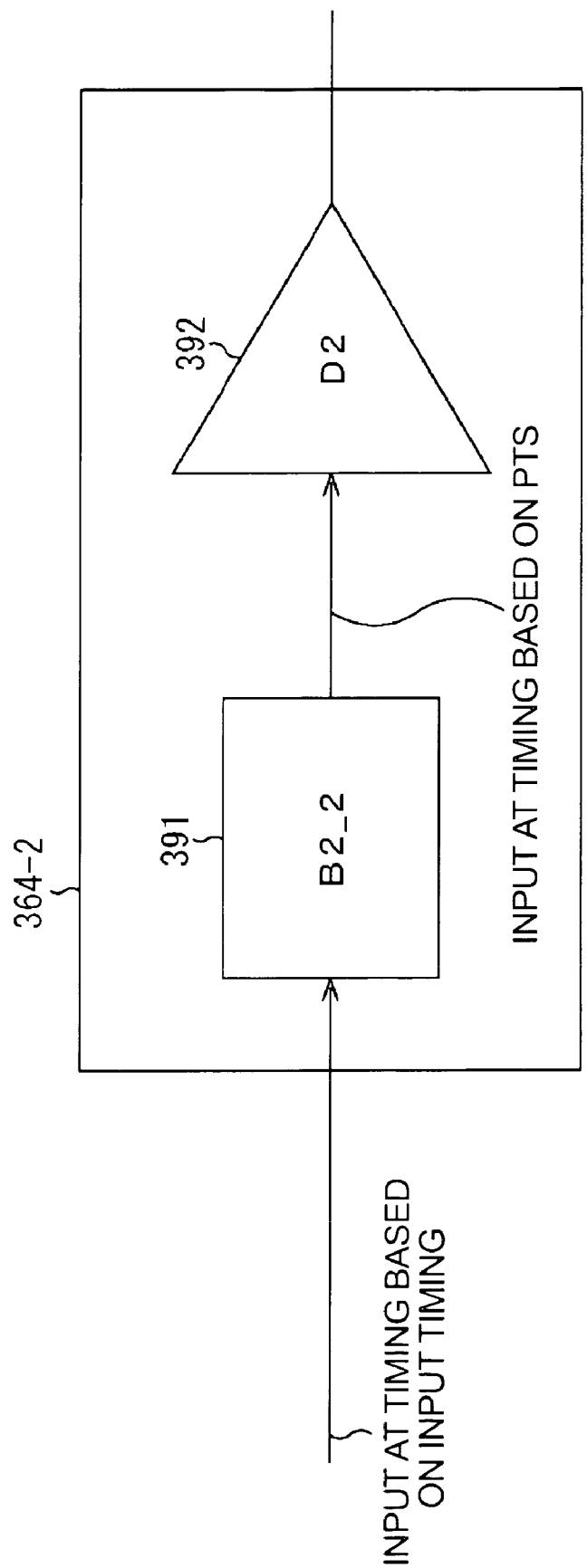
FIG. 11 illustrates a variable bit rate audio decoder of FIG. 10.

The variable bit rate audio decoder 364-2 extracts the audio access unit stored in the elementary buffer 363-2 at a predetermined timing, decodes it, and outputs it. More specifically, as shown in FIG. 11, the timing at which data is input to the FIFO buffer 391 of the variable bit rate audio decoder 364-2 is determined by the input timing (timing value) that is present in the HQ audio ES. This input timing, as described above, is a value that is attached when the second encoder 142 encodes audio data. That is, the data is input to the FIFO buffer 391 at a timing based on the input timing embedded in the HQ audio ES (the audio stream of the variable bit rate). Furthermore, the audio decoder 392 extracts the audio access unit from the FIFO buffer 391 when the PTS of the audio access unit becomes equal to the time on the system time clock of the T-STD, decodes it, and outputs it. That is, the FIFO buffer 391 is used as a buffer for the variable bit rate audio decoder 364-2. As described above, the FIFO buffer 391 and the audio decoder 392 realize the variable bit rate audio decoder 364-2.

At this time, since the timing of inputting data to the FIFO buffer 391 is determined on the basis of the input timing (timing value), it is not necessary to attach a DTS (Decoding Time Stamp) to the stream. As a result, when the HQ audio ES is packetized into PES packet, the PES packetization section 136 of the transmission apparatus 111 (FIG. 4) does not need to perform calculations for determining the DTS, and the PES packetization process can be performed more smoothly. Furthermore, the PES packetization section 136 may need only to store the input timing contained in advance in the HQ audio ES as it is in the PES payload 253 (FIG. 8) of the PES packet, and thus the PES packetization can be performed easily. That is, the amount of data of the PES packet can be reduced even more.

As described above, the HQ audio data decoding processing section 360-2 is a system target decoder in which the decoding of the HQ audio ES is assumed. In the following, the audio data decoding processing section 360 of the system target decoder 121, which is replaced with the HQ audio data decoding processing section 360-2, is referred to as a second system target decoder. That is, the system target decoder provided in the second virtual receiving apparatus is referred to as a second system target decoder.

The amount of occupied buffer of the elementary buffer 363-2 of FIG. 10 is decreased at the timing based on the input timing. Furthermore, the FIFO buffer 391 (B2_2) does not overflow, but has a possibility of underflowing. For this reason, the TS packet may need to be multiplexed at a timing at which the FIFO buffer 391 the (B2_2) does not underflow and the elementary buffer 363-2 (B2_1) does not overflow or underflow.

In FIG. 10, for example, the buffer size of the elementary buffer 363-1 (B1) is set as 18640 bytes, the buffer size of the elementary buffer 363-1 (B2_1)+the FIFO buffer 391 is set as 524250 bytes, the leak rate Rx1 is set as 2 Mbps, and the leak rate Rx2 is set as 1.2×18 Mbps.

It is necessary for the transmission apparatus 111 of FIG. 4 to sequentially determine and multiplex TS packets to be multiplexed from among the BS audio TS packet and the HQ audio TS packets so that the multiplex TS packets can be decoded by the virtual receiving apparatus 120 having the system target decoder 121 of FIG. 10.

That is, the transmission apparatus 111 may need to determine (adjust) audio TS packet to be multiplexed and multiplex them so that, for example, the transport buffer 362-1 and the transport buffer 362-2 of the system target decoder 121 of FIG. 10 does not overflow, the elementary buffer 363-1 and the elementary buffer 363-2 do not overflow or underflow, and the FIFO buffer 391 does not underflow.

For this purpose, the transmission apparatus 111 multiplexes the BS audio TS 173 and the HQ audio TS 183 of FIG. 6 and adjusts the multiplexing timing for generating the transport stream 190 so that conditions for the above-described system target decoder 121 of FIG. 10 are satisfied, that is, both the BS audio data decoding processing section 360-1 and the HQ audio data decoding processing section 360-2 of FIG. 10 can decode audio data. More specifically, the transmission apparatus 111 sequentially determines and multiplexes TS packet to be multiplexed at a timing at which the buffer of each of the first virtual receiving apparatus (the first system target decoder, that is, the system target decoder 121 having the BS audio data decoding processing section 360-1) and the second virtual receiving apparatus (the second system target decoder, that is, the system target decoder 121 having the HQ audio data decoding processing section 360-2) does not overflow or underflow.

Figure 12:
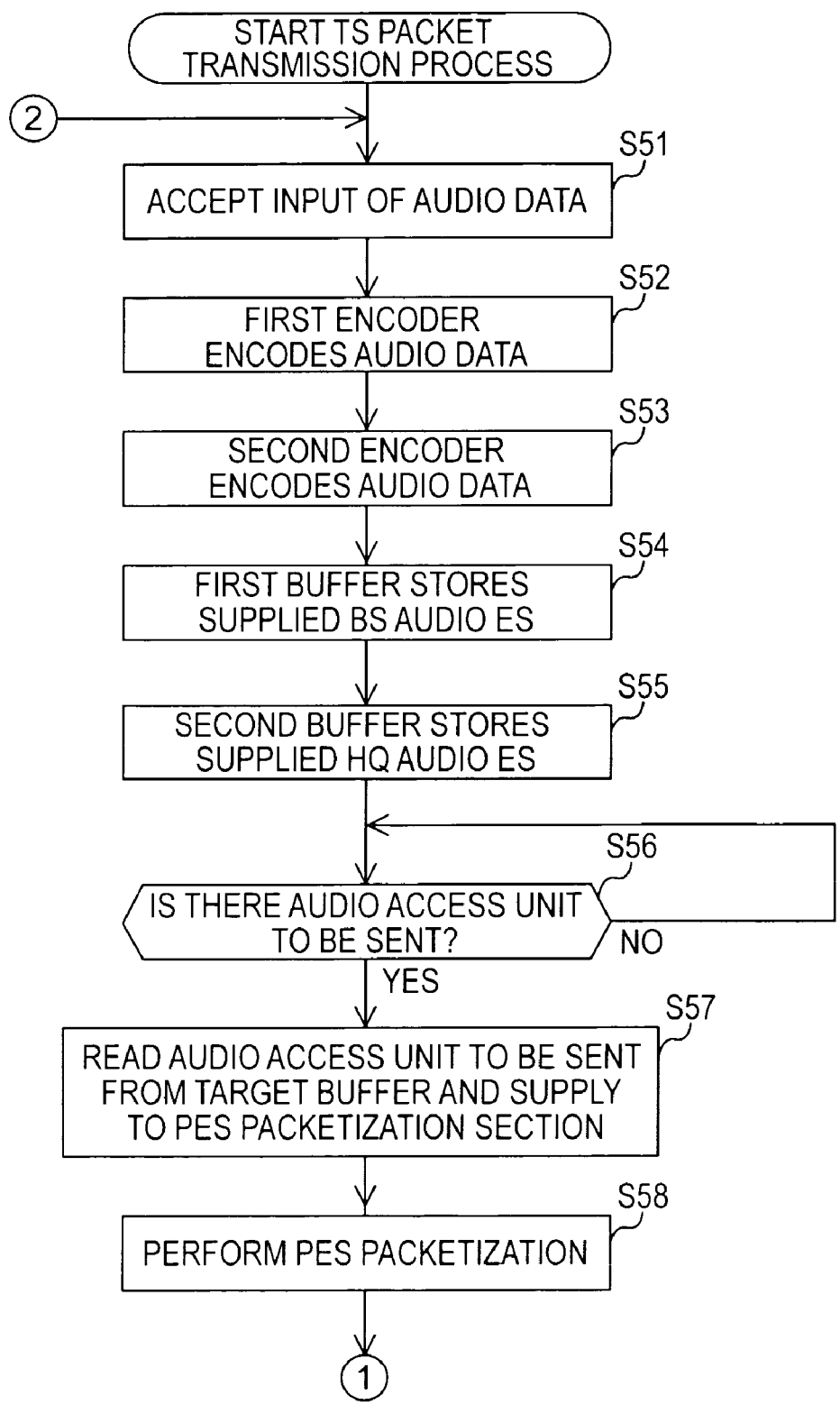
FIG. 12 is a flowchart illustrating a TS packet transmission process.
Figure 13:
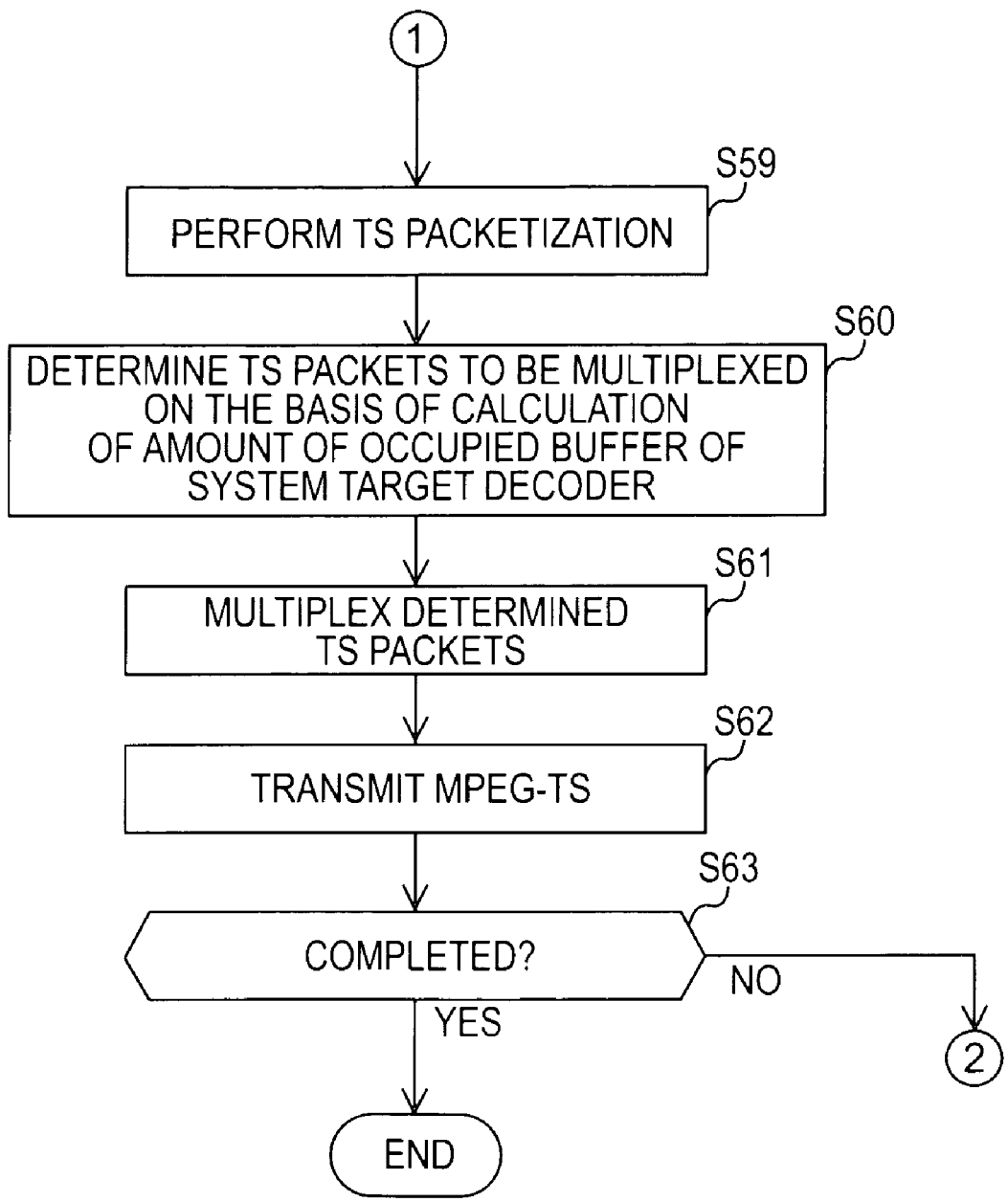
FIG. 13 is a flowchart illustrating a TS packet transmission process.

Next, a description will be given below of processing when the transmission apparatus 111 described thus far encodes an audio stream, packetizes it into TS packets, multiplexes and transmit them by considering the performance of the receiving apparatus 121. FIGS. 12 and 13 are flowcharts illustrating processing for transmitting TS packets in the transmission apparatus 111 of FIG. 4. This process begins when the power source of the transmission apparatus 111 is switched on and an audio stream is input to the input section 131.

In step S51, the input section 131 accepts input of audio data and outputs the accepted audio data to the audio encoder 132. More specifically, the input section 131 supplies the audio data to the first encoder 141 and the second encoder 142 of the audio encoder 132.

In step S52, the first encoder 141 encodes the audio data by a first encoding method. As described above, the first encoding method is, for example, a fixed-length encoding method. The first encoder 141 supplies the BS audio ES obtained as a result of the encoding to the first buffer 143 of the buffer 133 at a subsequent stage.

In step S53, the second encoder 142 encodes the audio data by a second encoding method. As described above, the second encoding method is a variable-length encoding method, and the second encoder 142 attaches an input timing during encoding (see the input timing of FIG. 8). The second encoder 142 supplies the HQ audio ES obtained as a result of the encoding to the second buffer 144 of the buffer 133 at a subsequent stage.

The BS audio ES output in step S52 from the first encoder 141 corresponds to the BS audio ES171 of FIG. 6, and the HQ audio ES output in step S53 from the second encoder 142 corresponds to the HQ audio ES 181 of FIG. 6.

In step S54, the first buffer 143 stores (buffers) the BS audio ES171 (see FIG. 6) supplied from the first encoder 141 of the audio encoder 13.

In step S55, the second buffer 144 stores (buffers) the HQ audio ES 181 (see FIG. 6) supplied from the second encoder 142 of the audio encoder 13.

In step S56, the control section 135 determines whether or not an audio access unit to be sent exists in the buffer 133 and waits processing until it is determined that an audio access unit to be sent exists in the buffer 133. Since the control section 135 monitors the elementary stream (the BS audio ES171 and the HQ audio ES 181) stored in the buffer 133 (the first buffer 143 and the second buffer 144) and manages the PTS, the control section 135 makes a determination as to step S56 on the basis of the above. More specifically, in the case of the BS audio ES, on the basis of the PTS, the control section 135 determines whether or not an audio access unit to be sent exists in the first buffer 143. In the case of the HQ audio ES, on the basis of the input timing, the control section 135 determines whether or not an audio access unit to be sent exists in the second buffer 144.

For example, each of the audio access units (for example, BS(1), BS(2), . . . , BS(n) of FIG. 6) of the BS audio ES171 has a fixed length. Therefore, the control section 135 determines whether or not the audio access unit (the audio access unit corresponding to the subscript h indicated with parentheses of FIG. 6) corresponding to the PTS(N)=PTS0+TT×h ("PTS" is a PTS of the first audio access unit, "TT" is a display interval of the access unit, and h is the number of the subscript indicated with parentheses of FIG. 6) is stored in the first buffer 143. Furthermore, each of the audio access units (for example, HQ(1), HQ(2), . . . , HQ(m) of FIG. 6) of the HQ audio ES 181 has a fixed length. Therefore, the control section 135 determines whether or not the audio access unit is stored in the second buffer 144 on the basis of the input timing attached to the HQ audio ES 181. This is for the reasons described below. Unlike in the case of the BS audio ES, the audio access unit of the HQ audio ES is a variable length, when the HQ audio ES is controlled by the PTS, if, for example, the size of the access unit is large, transfer is not in time, and there is a possibility of causing an underflow. As a consequence, the variable bit rate audio decoder may need to be passed at a time determined by the input timing earlier than the time of the time of the PTS.

The fixed length and the variable length as referred to herein are definitions with respect to the data size of the audio access unit, and the display interval with respect to one audio access unit is fixed with respect to each of the fixed length and the variable length. For example, the display interval of the BS audio ES is set as 32 milliseconds per access unit, and the display interval of the HQ audio ES is set as a ¹⁄₁₂₀₀ of a second per access unit.

When it is determined in step S56 that the audio access unit to be sent exists, in step S57, the control section 135 performs control so that the audio access unit to be sent is read from the target buffer 133 and is supplied to the PES packetization section 136. For example, the control section 135 performs control so that the audio access unit to be sent is read from the first buffer 143 and is supplied to the PES packetization section 136. Furthermore, for example, the control section 135 performs control so that the audio access unit to be sent is read from the second buffer 144 and is supplied to the PES packetization section 136. Furthermore, the control section 135 instructs the PES packetization section 136 to packetize an audio access unit into PES packets, and the process then proceeds to step S58.

In step S58, the PES packetization section 136 packetizes the audio access unit supplied in the process of step S57 into PES packets. More specifically, the PES packetization section 136 packetizes into PES packet, the audio access unit (the audio access unit of the BS audio ES or the HQ audio ES) supplied from the first buffer 143 or the second buffer 144 in the process of step S57, in which the PTS supplied from the control section 135 is contained. The PES packetization section 136 supplies the PES packet generated as a result of being packetized into PES packets to the TS packetization section 137.

For example, the PES packetization section 136 obtains the BS audio ES supplied from the first buffer 143 (obtains the audio access unit corresponding to the PTS) and packetizes the BS audio ES into PES packets. Furthermore, for example, the PES packetization section 136 obtains the HQ audio ES supplied from the second buffer 144 (obtains the audio access unit corresponding to the input timing) and packetizes the HQ audio ES into PES packets. At this time, the PES packetization section 136 stores the PTS supplied from the control section 135 in each of the PES packets constituting the PES packet stream (for example, the BS audio PES 172 or the HQ audio PES 182 of FIG. 6). Then, the PES packetization section 136 supplies, to the TS packetization section 137, the generated PES packet (for example, the PES packet that is subjected to PES packetization in the process of step S57 within the BS audio PES 172 of FIG. 6, or the PES packet that is subjected to PES packetization in the process of step S57 within the HQ audio PES 182 of FIG. 6).

The BS audio PES output from the PES packetization section 136 in step S58 corresponds to the BS audio PES 172 of FIG. 6, and the HQ audio PES output from the PES packetization section 136 in step S58 corresponds to the HQ audio PES 182 of FIG. 6.

In step S59, the TS packetization section 137 packetizes the PES packet supplied from the PES packetization section 136 into TS packets, and supplies the TS packets that are subjected to TS packetization to the multiplexing section 138. For example, the TS packetization section 137 packetizes into TS packet, a plurality of BS audio PES packets constituting the BS audio PES 172 as for a plurality of BS audio TS packets constituting the BS audio TS 173 of FIG. 6. Furthermore, for example, the TS packetization section 137 packetizes into TS packet, a plurality of HQ audio PES packets constituting the HQ audio PES 182 as for a plurality of HQ audio TS packets constituting the HQ audio TS 183 of FIG. 6. Then, the TS packetization section 137 supplies the plurality of HQ audio TS packets constituting the HQ audio TS 183 to the multiplexing section 138 at a subsequent stage.

At this time, in each TS header of the BS audio TS 173 and the HQ audio TS 183, in which TS packetization is performed, as shown in FIG. 7, the same PID is attached, and a different value of the transport_priority is attached. In the case of the example of FIG. 5, "PID=a0, tp=1" is contained in each TS packet of the BS audio TS 183, and "PID=a0, tp=0" is contained in each TS packet of the HQ audio TS 183.

In step S60, the control section 135 determines TS packets to be multiplexed on the basis of the calculation of the amount of occupied buffer of the system target decoder 121. More specifically, on the basis of the amount of occupied buffer of the first system target decoder and the second system target decoder (see FIGS. 9 and 10), the control section 135 determines a TS packet to be multiplexed next (TS packet of one of the BS audio TS packet and the HQ audio TS packet), and controls the multiplexing section 138 so that the TS packet determined so as to be multiplexed is multiplexed. The is, the control section 135 determines the order of the TS packets to be multiplexed so that the BS audio TS 173 and the HQ audio TS 183 of FIG. 6 are multiplexed to generate the transport stream 190. The process for calculating the amount of occupied buffer of the system target decoder 121 (the first system target decoder and the second system target decoder) will be described later with reference to FIGS. 14 and 15.

In step S61, the multiplexing section 138 multiplexes the TS packet determined to be multiplexed in the process of step S60 by the control section 135 from among the TS packets supplied from the TS packetization section 137. More specifically, the multiplexing section 138 (sequentially) multiplexes the TS packets determined to be multiplexed in the process of step S60 from among the TS packets of the BS audio TS 173 and the TS packet of the HQ audio TS 183 of FIG. 6. As a result, the transport stream 190 of FIG. 6 is generated. The multiplexing section 138 supplies the transport stream 190 that is generated by multiplexing the BS audio TS 173 and the HQ audio TS 183 to the transmission section 139.

In step S62, the transmission section 139 transmits the transport stream 190 (FIG. 6) supplied from the multiplexing section 138. For example, as shown in FIG. 3, the transmission section 139 controls the drive 112 in order to transmit a transport stream (MPEG2-TS) to the removable medium 113 or controls the communication section 114 in order to transmit a transport stream (MPEG2-TS) to the receiving apparatus via the network 115. This receiving apparatus is not the virtual receiving apparatus 120 described with reference to FIGS. 3 and 9, but is a receiving apparatus (not shown) (having a decoder) for actually receiving an MPEG2-TS.

In step S63, the control section 135 determines whether or not the processing should be completed. For example, the control section 135 determines that the processing should be completed when the input of the audio data to the input section 131 is completed, when the completion of the TS packet transmission process is instructed by a user, or when the transmission of one audio stream is completed. When it is determined in step S63 that the processing should not be completed, the process returns to step S51, and the processing of step S51 and subsequent steps is repeated. That is, an input of the audio data is accepted again and is packetized into TS packet, the TS packet to be multiplexed is determined and multiplexed on the basis of the calculation of the amount of occupied buffer of the system target decoder 121, and the transport stream generated as a result of being multiplexed is transmitted. When it is determined in step S63 that the processing should be completed, the processing is completed.

As a result of the processing of FIGS. 12 and 13, the TS packets are multiplexed in an order in which the TS packets are multiplexed on the basis of the calculation of the amount of occupied buffer of the first system target decoder and the second system target decoder (system target decoder 121) described with reference to FIGS. 9 and 10. As a consequence, it is possible for the receiving apparatus (not shown) having a decoder corresponding to the model of the system target decoder 121 of FIGS. 9 and 10 to reliably decode a transport stream (a plurality of TS packets) multiplexed in this process.

Next, a description will be given, with reference to FIGS. 14 and 15, of the calculation of the amount of occupied buffer of the system target decoder, which is performed by the control section 135 in step S60 of FIG. 13.

First, referring to the flowchart in FIG. 14, a description will be given of a process for calculating the amount of occupied buffer with respect to BS audio will be described. This process is a process in which the control section 135 of FIG. 4 calculates the timing of multiplexing the TS packets by assuming that the system target decoder 121 on the reception side can decode only the BS audio ES. That is, this is a process performed by the control section 135 by assuming that the system target decoder 121 on the receiving side is a first system target decoder.

In step S101, the control section 135 controls the multiplexing section 138 so that, if a transport buffer 362-1 of the BS audio data decoding processing section 360-1 of FIG. 10 has a vacancy where TS packets of tp=1 are held, the TS packet are multiplexed. That is, if the transport buffer 362-1 of FIG. 10 has a vacancy where the BS audio TS packets (TS packets) corresponding to the BS audio ES are held, the multiplexing section 138 is controlled so that the BS audio TS packets are multiplexed.

In step S102, if the elementary buffer 363-1 (Bn=B1) of the system target decoder 121 of FIG. 10 has a vacancy, the control section 135 extracts data at a bit rate of Rx1 (Rxn=Rx1) from the transport buffer 362-1, and calculates by assuming that this data is supplied to the elementary buffer 363-1 (B1). As described above, since the bit rate of input to the first system target decoder elementary buffer 363-1 is Rx1, a calculation is performed by assuming that data is extracted at a rate of Rx1 and that the storage capacity of the elementary buffer 363-1 is Bn=B1.

In step S103, the control section 135 performs calculations by assuming that, when the PTS of the audio access unit becomes equal to the time on the system time clock of the system target decoder 121, the audio access unit is extracted from the elementary buffer 363-1 (B1) and is supplied to the audio decoder 364-1. For example, the control section 135 performs calculations by assuming that, when the system time clock of the system target decoder 121 becomes equal to the PTS of the audio access unit, the audio access unit of the PTS is extracted from the elementary buffer 363-1 and is supplied to the audio decoder 364-1. Thereafter, the processing is completed.

Figure 14:
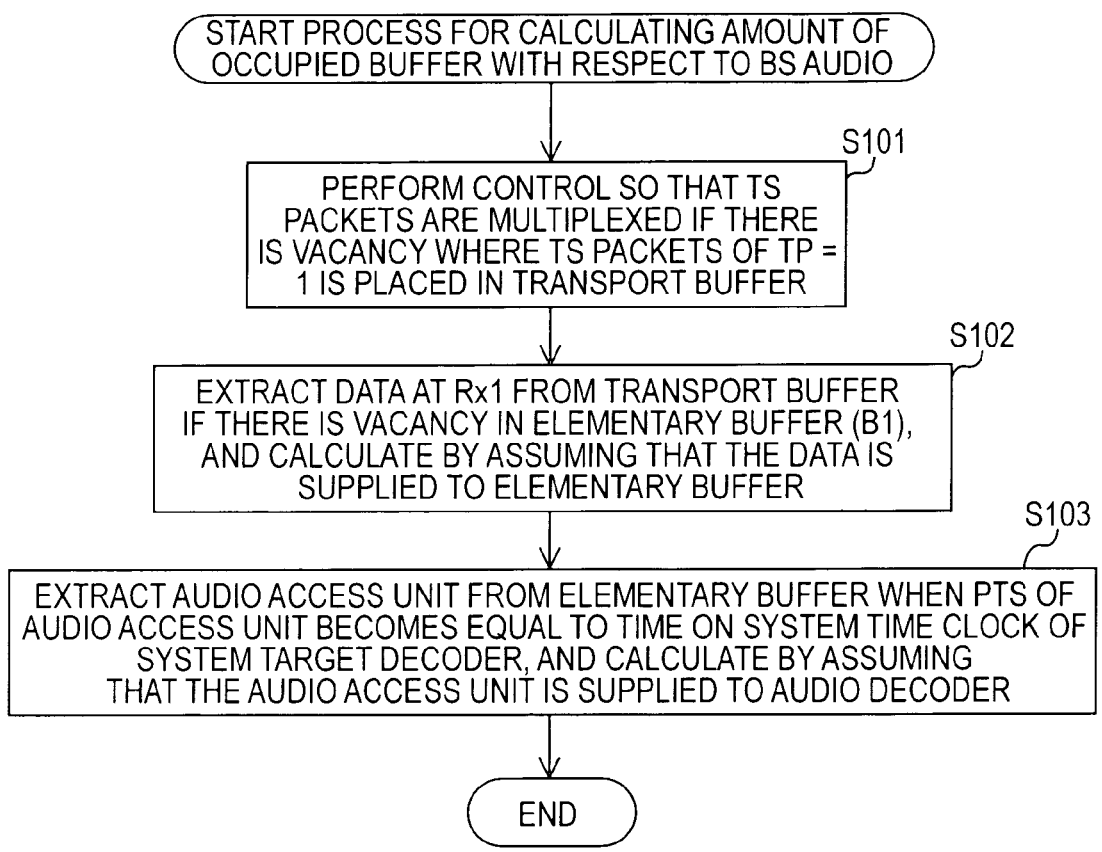
FIG. 14 is a flowchart illustrating a process for calculating an amount of occupied buffer with respect to BS audio.

The processing of FIG. 14 is processing performed when the process of step S60 of FIG. 13 is repeatedly performed.

As described above, the control section 135 calculates the amount of occupied buffer of the decoder by assuming a decoder (the first system target decoder) capable of decoding only the BS audio ES. That is, the control section 135 calculates the amount of occupied buffer of the first system target decoder and determines the multiplexing timing of the TS packet by assuming that the BS audio data decoding processing section 360-1 of FIG. 10 is provided in the audio data decoding processing section 360 of FIG. 9. As a result, it is possible for the decoder (actual decoder) capable of decoding only the BS audio ES to reliably decode the BS audio ES without overflowing or underflowing the amount of occupied buffer.

Next, a description will be given, with reference to the flowchart in FIG. 15, of the amount of occupied buffer calculation process for HQ audio. This process is a process in which the control section 135 of FIG. 4 calculates the timing of multiplexing TS packet by assuming that the system target decoder 121 on the receiving side can decode an HQ audio ES. That is, this is a process performed by the control section 135 by assuming that the system target decoder 121 on the receiving side is a second system target decoder.

In step S151, the control section 135 controls the multiplexing section 138 so that, if the transport buffer 362-2 of the HQ audio data decoding processing section 360-2 of FIG. 10 has a vacancy where the TS packets of tp=0 are held, the TS packets are multiplexed. That is, if a transport buffer 362-2 of FIG. 10 has a vacancy where the HQ audio TS packets (the TS packets corresponding to the HQ audio ES) are held, the multiplexing section 138 is controlled so as to multiplex the HQ audio TS packets.

In step S152, if the elementary buffer 363-2 (Bn=B2_1) of the system target decoder 121 of FIG. 10 has a vacancy, the control section 135 extracts the data at a bit rate of Rx2 (Rxn=Rx2) from the transport buffer 362-2 and calculates by assuming that the data is supplied to the elementary buffer 363-2 (B2_1). As described above, since the bit rate for the input to the elementary buffer 363-2 of the second system target decoder is Rx2, calculations are performed by assuming that data is extracted at a rate of Rx2, and calculations are performed by assuming that the storage capacity of the elementary buffer 363-2 is Bn=B2_1.

In step S153, on the basis of the input timing of the audio access unit, the control section 135 extracts the audio access unit from the elementary buffer 363-2 (B2_1) and calculates by assuming that the audio access unit is supplied to the FIFO buffer 391 (B2_2). As described above, since the input timing (see FIG. 8) is attached to the HQ audio ES that is encoded and output by the second encoder 142, on the basis of the input timing, the control section 135 extracts the audio access unit from the elementary buffer 363-2 (B2_1) and calculates by assuming that the audio access unit is supplied to the FIFO buffer 391 (B2_2).

In step S154, on the basis of the PTS of the audio access unit, the control section 135 extracts the audio access unit from the FIFO buffer 391 (B2_2), and calculates by assuming that the audio access unit is supplied to the audio decoder 392. More specifically, the control section 135 extracts the audio access unit from the FIFO buffer 391 when the PTS of the audio access unit becomes equal to the time on the system time clock of the system target decoder 121 (the second system target decoder), and calculates by assuming that the audio access unit is supplied to the audio decoder 392. Thereafter, the processing is completed. As described above, in the elementary buffer 363-2 (B2_1), the amount of occupied buffer is decreased at a timing based on the input timing. Furthermore, the FIFO buffer 391 (B2_2) will not overflow, but may underflow. For this reason, as shown in FIG. 15, the TS packets are multiplexed at a timing at which the elementary buffer 363-2 (B2_1) does not overflow or underflow so that the FIFO buffer 391 (B2_2) does not underflow.

Figure 15:
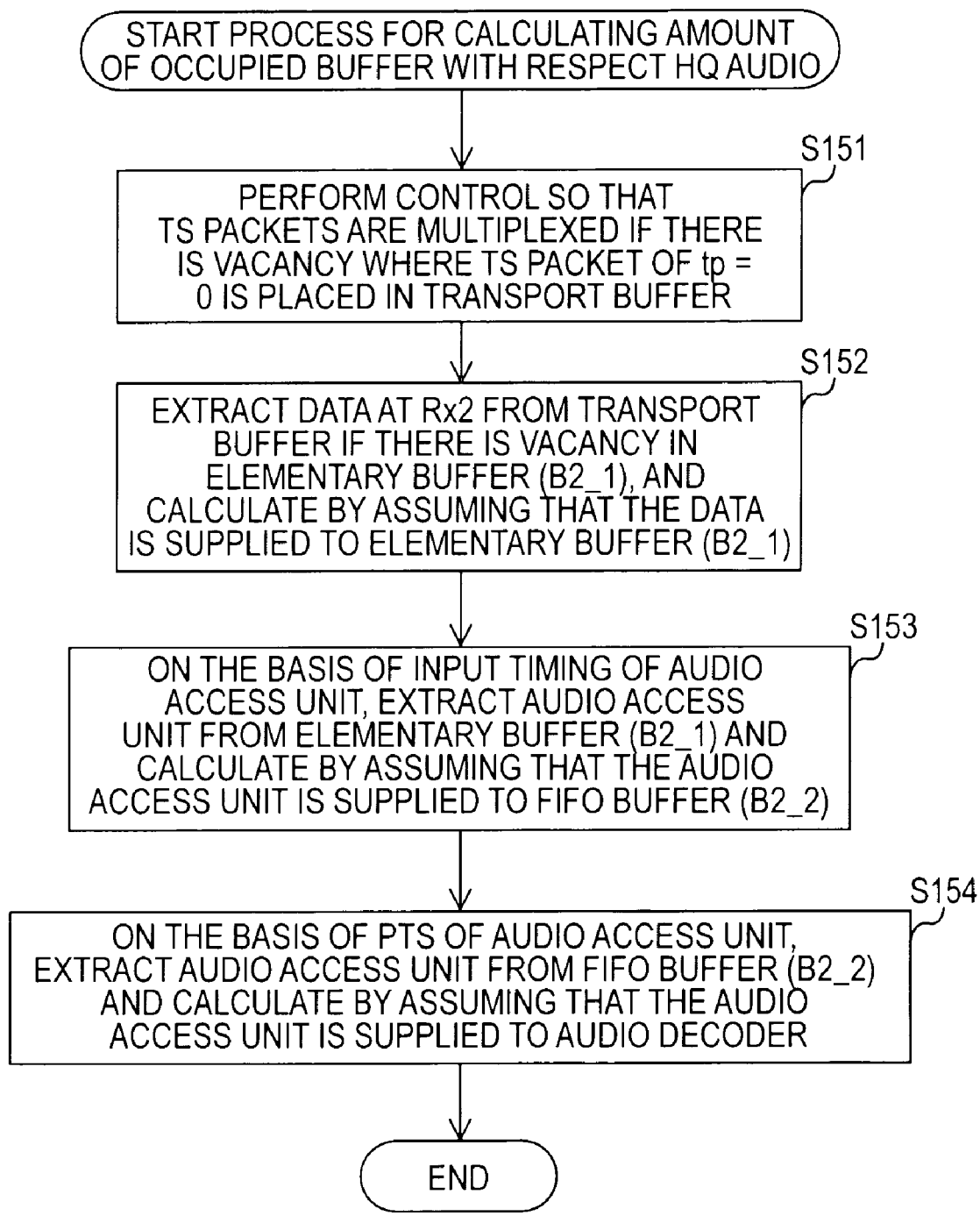
FIG. 15 is a flowchart illustrating a process for calculating an amount of occupied buffer with respect to HQ audio.

The processing of FIG. 15 is processing performed when the process of step S60 of FIG. 13 is performed, and is repeatedly performed. That is, when the process of step S60 of FIG. 13 is to be performed, the processing of FIG. 14 and FIG. 15 is performed in parallel. More specifically, when the process of step S60 of FIG. 13 is to be performed, the control section 135 repeatedly performs the process for calculating the timing of multiplexing the TS packet corresponding to the BS audio by the process of FIG. 14 and the process for calculating the timing of multiplexing the TS packets corresponding to the HQ audio by the process of FIG. 15.

In other words, the control section 135 determines (adjusts) an audio TS packet to be multiplexed so that the transport buffer 362-1 and the transport buffer 362-2 in the system target decoder 121 of FIG. 10 do not overflow, the elementary buffer 363-1 and the elementary buffer 363-2 do not overflow or underflow, and the FIFO buffer 391 does not underflow.

As described above, the control section 135 calculates the amount of occupied buffer of the decoder by assuming the system target decoder (the first system target decoder) capable of decoding the BS audio ES and the system target decoder (the second system target decoder) capable of decoding the HQ audio ES, and determines TS packets to be multiplexed (determines the order of the TS packets to be multiplexed). As a result, it is possible for even the decoder (actual decoder) capable of decoding only the BS audio ES or for even the decoder (actual decoder) capable of decoding only the HQ audio ES to reliably decode the audio ES without overflowing or underflowing the amount of occupied buffer.

That is, even when the actual receiving apparatus for receiving the TS packets (MPEG2-TS) that are actually multiplexed by the transmission apparatus 111 can decode only the BS audio ES or even when the actual receiving apparatus can decode the HQ audio ES, it is possible to smoothly decode the audio ES without overflowing or underflowing the buffer possessed by each receiving apparatus.

Although the BS audio ES and the HQ audio ES are identified by the value of the transport_priority (tp) as shown in FIG. 7, since they are in a relation independent of each other, there are no constraints when the BS audio TS packet and the HQ audio TS packet are multiplexed. Therefore, the BS audio ES and the HQ audio ES can be handled as independent streams.

As a result of the above, when the BS audio ES and the HQ audio ES that are generated as a result of being encoded by different encoding methods are each packetized into TS packets and are multiplexed into one transport stream, the second virtual receiving apparatus 120 having the first system target decoder corresponding to only the BS audio ES (the system target decoder 121 of FIG. 9 having the BS audio data decoding processing section 360-1 of FIG. 10) and the second virtual receiving apparatus 120 having the second system target decoder (the system target decoder 121 of FIG. 9 having the HQ audio data decoding processing section 360-2 of FIG. 10) corresponding to the HQ audio ES are assumed, the TS packets to be multiplexed are determined. Therefore, it is possible for even the receiving apparatus that corresponds to only the BS audio ES or for even the receiving apparatus that corresponds to the HQ audio ES to smoothly decode the audio data.

The transmission apparatus 111 adjusts (determines) the TS packets to be multiplexed so that the transport buffer 362-1 of the virtual the first receiving apparatus having the first system target decoder does not overflow and the elementary buffer 363-1 does not overflow or underflow. Also, the transmission apparatus 111 adjusts (determines) the TS packets to be multiplexed so that the transport buffer 362-2 of the virtual the second receiving apparatus having the second system target decoder does not overflow, the elementary buffer 363-2 does not overflow or underflow, and the FIFO buffer 391 does not underflow. As a consequence, it is possible for even the receiving apparatus corresponding to only the BS audio ES or for even the receiving apparatus corresponding to the HQ audio ES to smoothly decode the audio data.

Furthermore, when the HQ audio ES is to be packetized into PES packets, the PES packetization section 136 does not need to perform calculations for determining the DTS, and the PES packetization process can be performed more smoothly. Furthermore, since the PES packetization section 136 does not need to store the value of the DTS in the PES packet to be generated, the amount of data of the PES packets can be reduced. That is, the amount of data of the PES packet can be reduced further.

The present invention can be applied to all multiplexing apparatuses for multiplexing TS packet of an audio stream (audio ES) without being limited to the transmission apparatus 111 of FIG. 4.

In the above examples, the order (timing) when the BS audio ES encoded by the first encoder 141 and the HQ audio ES encoded by the second encoder 142 are each packetized into TS packets and are multiplexed into one stream has been described. The present invention can be applied to another case as long as it is a case in which an audio ES encoded by different encoding methods are packetized into TS packets and are multiplexed into one stream.

The above-described series of processing can be performed by hardware and can also be performed by software. In this case, the above-described processing is performed by a personal computer 500 shown in FIG. 16.

Figure 16:
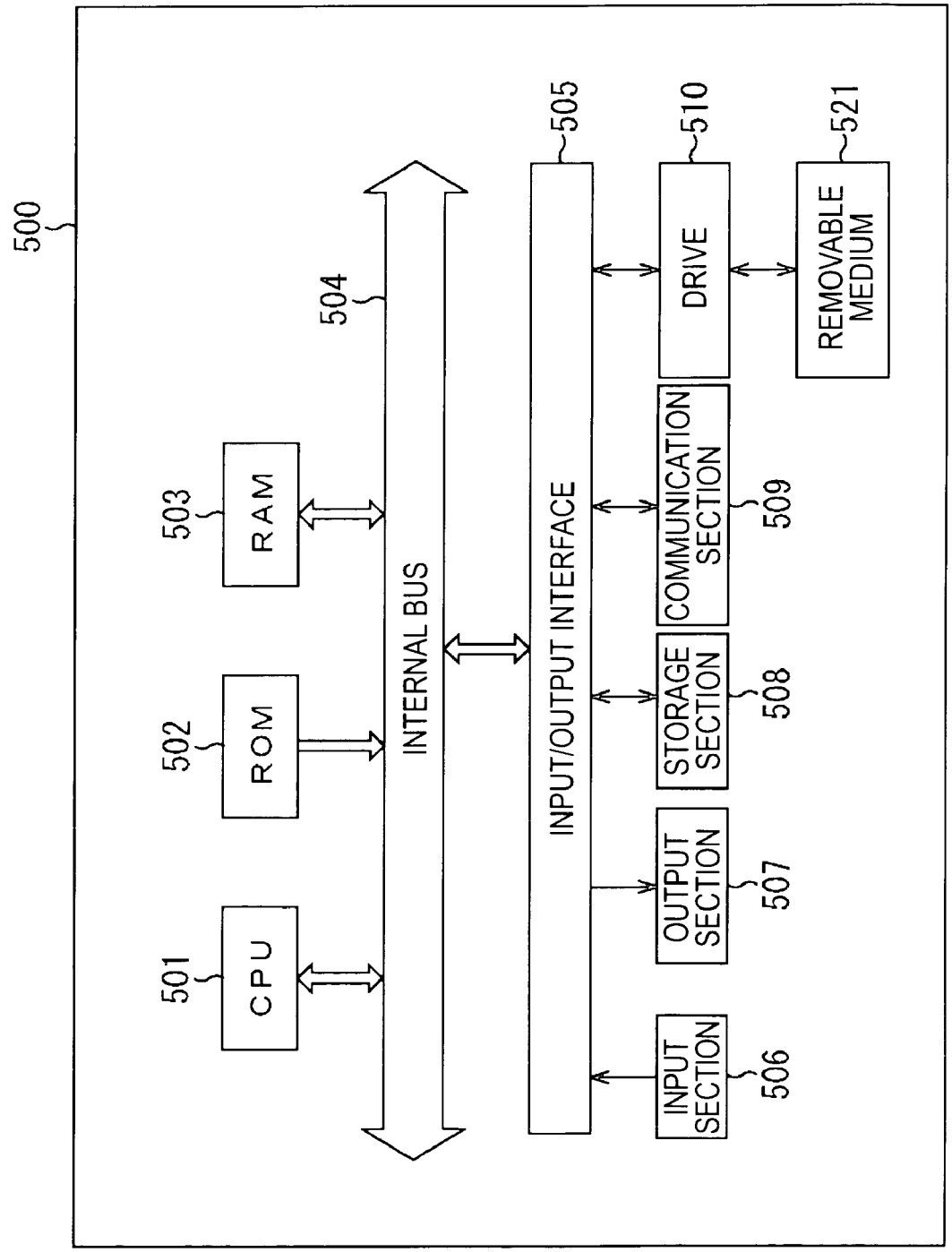
FIG. 16 shows an example of the configuration of a personal computer.

In FIG. 16, a CPU 501 performs various kinds of processing in accordance with a program stored in a ROM 502 or a program loaded from a storage section 508 to a RAM 503. The ROM 502 and RAM 501 both being a computer readable medium. In the RAM 503, data necessary for the CPU 501 to perform various kinds of processing is stored as appropriate.

The CPU 501, the ROM 502, and the RAM 503 are interconnected to one another via an internal bus 504. An input/output interface 505 is also connected to the internal bus 504.

An input section 506 including a keyboard, a mouse, etc., an output section 507 including a CRT, an LCD, a display, a speaker, etc., a storage section 508 including a hard disk, etc., and a communication section 509 including a modem, a terminal adaptor, etc., are connected to the input/output interface 505. The communication section 509 performs a communication process via various kinds of networks including a telephone line and CATV.

A drive 510 is connected to the input/output interface 505 as necessary. A removable medium 521 formed of a magnetic disk, an optical disc, a magneto-optical disc or a semiconductor memory is installed thereinto as appropriate, and a computer program read therefrom is installed to the storage section 508 as necessary.

When the series of processing is to be performed by software, programs forming the software are installed from a network or a recording medium.

The recording medium, as shown in FIG. 16, is formed of a packaged medium composed of a removable medium, in which a program is recorded, the recording medium being distributed to provide the program to the user separately from a computer. In addition, the recording medium is formed of a hard disk containing the ROM 502 and the storage section 508 in which a program is recorded, which is provided to the user by being incorporated in advance into the computer.

In this specification, the steps for writing a program include not only processes which are carried out chronologically in the written order, but also include processes which are executed concurrently or individually although these steps are not necessarily processed chronologically.

It should be understood by those skilled in the art that various modifications, combinations, sub-combinations and alterations may occur depending on design requirements and other factors insofar as they are within the scope of the appended claims or the equivalents thereof.

What is claimed is:

1. A multiplexing apparatus for multiplexing audio data into transport stream (TS) packets, the multiplexing apparatus comprising:

first encoding means for encoding the audio data by a first encoding method, which is a predetermined encoding method;

second encoding means for encoding the audio data by a second encoding method, which is a variable-length encoding method, which differs from the first encoding method, and which attaches a timing value indicating a timing used when audio data is decoded in units of predetermined audio data;

packetization means for packetizing the audio data encoded by the first encoding means and the audio data encoded by the second encoding means into TS packets and for attaching the same ID to a plurality of packetized TS packets;

determination means for determining a TS packet to be multiplexed from among the plurality of TS packets packetized by the packetization means; and multiplexing means for multiplexing the TS packet determined by the determination means, wherein the determination means assumes a first system target decoder for decoding the audio data encoded by the first encoding means and a second system target decoder for decoding the audio data encoded by the second encoding means on the basis of the timing value attached to the audio data encoded by the second encoding means, and determines a TS packet to be multiplexed, wherein the determination means determines a TS packet to be multiplexed from among the plurality of TS packets packetized by the packetization means on the basis of a first elementary buffer possessed by the first system target decoder and a rate at which data is transferred to the first elementary buffer and on the basis of a second elementary buffer possessed by the second system target decoder and a rate at which data is transferred to the second elementary buffer.

2. The multiplexing apparatus according to claim 1, wherein the determination means determines a TS packet to be multiplexed from among the plurality of TS packets packetized by the packetization means so that the first elementary buffer possessed by the first system target decoder and the second elementary buffer possessed by the second system target decoder do not overflow or underflow.

3. The multiplexing apparatus according to claim 1, further comprising recording means for recording the TS packets multiplexed by the multiplexing means on a recording medium.

4. The multiplexing apparatus according to claim 1, wherein the unit of the audio data is an audio access unit.

5. The multiplexing apparatus according to claim 1, wherein the first system target decoder has a transport buffer at a stage prior to the first elementary buffer, and the second system target decoder has a transport buffer at a stage prior to the second elementary buffer and has a third elementary buffer at a stage subsequent to the second elementary.

6. The multiplexing apparatus according to claim 5, wherein the determination means determines a TS packet to be multiplexed from among the plurality of TS packets packetized by the packetization means by assuming that the timing for input to the third elementary buffer is a timing for the timing value.

7. The multiplexing apparatus according to claim 6, wherein the timing value is a value represented by a sampling period of audio information, at which the unit of an audio stream is passed to the third elementary buffer.

8. A multiplexing method for use with a multiplexing apparatus for multiplexing audio data into transport stream (TS) packets, the multiplexing method comprising the steps of:

encoding the audio data by a first encoding method, which is a predetermined encoding method;

encoding the audio data by a second encoding method, which is a variable-length encoding method, which differs from the first encoding method, and which attaches a timing value indicating a timing used when audio data is decoded in units of predetermined audio data;

packetizing the audio data encoded in the first encoding step and the audio data encoded in the second encoding step into TS packets and attaching the same ID to a plurality of packetized TS packets;

determining a TS packet to be multiplexed from among the plurality of TS packets packetized in the packetization step; and multiplexing the TS packet determined in the determination step, wherein the determination step assumes a first system target decoder for decoding the audio data encoded in the first encoding step, and a second system target decoder for decoding the audio data encoded in the second encoding step on the basis of the timing value attached to the audio data encoded in the second encoding step, and determines a TS packet to be multiplexed, wherein the determining step determines a TS packet to be multiplexed from among the plurality of TS packets packetized in the packetizing step on the basis of a first elementary buffer possessed by the first system target decoder and a rate at which data is transferred to the first elementary buffer and on the basis of a second elementary buffer possessed by the second system target decoder and a rate at which data is transferred to the second elementary buffer.

9. A computer readable medium having recorded thereon a program with computer readable instructions that when executed multiplex audio data into transport stream (TS) packets, the instructions when executed by processor perform processing comprising the steps of:

encoding with the processor the audio data by a first encoding method, which is a predetermined encoding method;

encoding the audio data by a second encoding method, which is a variable-length encoding method, which differs from the first encoding method, and which attaches a timing value indicating a timing used when audio data is decoded in units of predetermined audio data;

packetizing the audio data encoded in the first encoding step and the audio data encoded in the second encoding step into TS packets and attaching the same ID to a plurality of packetized TS packets;

determining a TS packet to be multiplexed from among the plurality of TS packets packetized in the packetization step; and multiplexing the TS packet determined in the determination step, wherein the determination step assumes a first system target decoder for decoding the audio data encoded in the first encoding step, and a second system target decoder for decoding the audio data encoded in the second encoding step on the basis of the timing value attached to the audio data encoded in the second encoding step, and determines a TS packet to be multiplexed, wherein the determining step determines a TS packet to be multiplexed from among the plurality of TS packets packetized in the packetizing step on the basis of a first elementary buffer possessed by the first system target decoder and a rate at which data is transferred to the first elementary buffer and on the basis of a second elementary buffer possessed by the second system target decoder and a rate at which data is transferred to the second elementary buffer.

10. A multiplexing apparatus for multiplexing audio data into transport stream (TS) packets, the multiplexing apparatus comprising:

a first encoding section encoding the audio data by a first encoding method, which is a predetermined encoding method;

a second encoding section encoding the audio data by a second encoding method, which is a variable-length encoding method and which differs from the first encoding method, for attaching a timing value indicating a timing used when audio data is decoded in units of predetermined audio data;

a packetization section packetizing the audio data encoded by the first encoding section and the audio data encoded by the second encoding section into TS packets and attaching the same ID to a plurality of packetized TS packets;

a determination section determining a TS packet to be multiplexed from among the plurality of TS packets packetized by the packetization section; and a multiplexing section multiplexing the TS packet determined by the determination section, wherein the determination section assumes a first system target decoder for decoding the audio data encoded by the first encoding section and a second system target decoder for decoding the audio data encoded by the second encoding section on the basis of the timing value attached to the audio data encoded by the second encoding section, and determines a TS packet to be multiplexed, wherein the determination section determines a TS packet to be multiplexed from among the plurality of TS packets packetized by the packetization section on the basis of a first elementary buffer possessed by the first system target decoder and a rate at which data is transferred to the first elementary buffer and on the basis of a second elementary buffer possessed by the second system target decoder and a rate at which data is transferred to the second elementary buffer.

* * * * *